US011359088B2

(12) United States Patent
Allen et al.

(10) Patent No.: US 11,359,088 B2
(45) Date of Patent: Jun. 14, 2022

(54) POLYMERIC ARTICLES COMPRISING BLENDS OF PBAT, PLA AND A CARBOHYDRATE-BASED POLYMERIC MATERIAL

(71) Applicant: BiologiQ, Inc., Idaho Falls, ID (US)

(72) Inventors: Donald R. Allen, Idaho Falls, ID (US); Wenji Quan, Idaho Falls, ID (US); Bradford LaPray, Idaho Falls, ID (US)

(73) Assignee: BIOLOGIQ, INC., Idaho Falls, ID (US)

( * ) Notice: Subject to any disclaimer, the term of this patent is extended or adjusted under 35 U.S.C. 154(b) by 10 days.

(21) Appl. No.: 16/925,952

(22) Filed: Jul. 10, 2020

(65) Prior Publication Data

US 2020/0339803 A1  Oct. 29, 2020

Related U.S. Application Data

(63) Continuation-in-part of application No. 16/425,397, filed on May 29, 2019, which is a continuation-in-part of application No. 15/691,588, filed on Aug. 30, 2017, now Pat. No. 11,046,840, which is a continuation-in-part of application No. 15/481,823, filed on Apr. 7, 2017, now Pat. No. 10,919,203, and a continuation-in-part of application No. 15/481,806, filed on Apr. 7, 2017, now Pat. No. 10,995,201, and a continuation-in-part of application No. 14/853,725, filed on Sep. 14, 2015, now abandoned, and a continuation-in-part of application No. 14/853,780, filed on Sep. 14, 2015, now abandoned.

(60) Provisional application No. 62/875,872, filed on Jul. 18, 2019, provisional application No. 62/872,589, filed on Jul. 10, 2019, provisional application No. 62/677,368, filed on May 29, 2018, provisional application No. 62/442,432, filed on Jan. 4, 2017, provisional application No. 62/440,399, filed on Dec. 29, 2016, provisional application No. 62/187,231, filed on Jun. 30, 2015.

(51) Int. Cl.
*C08L 67/02* (2006.01)
*C08L 3/02* (2006.01)

(52) U.S. Cl.
CPC ............. *C08L 67/02* (2013.01); *C08L 3/02* (2013.01); *C08L 2205/03* (2013.01)

(58) Field of Classification Search
CPC .............................. C08L 3/02; C08L 2205/03
See application file for complete search history.

(56) References Cited

U.S. PATENT DOCUMENTS

| | | |
|---|---|---|
| 3,270,874 A | 9/1966 | Hilton |
| 3,865,603 A | 2/1975 | Szymanski et al. |
| 4,016,117 A | 4/1977 | Griffin |
| 4,139,699 A | 2/1979 | Hernandez |
| 4,243,480 A | 1/1981 | Hernandez |
| 4,853,168 A | 8/1989 | Eden et al. |
| 5,026,745 A | 6/1991 | Weil |
| 5,095,054 A | 3/1992 | Lay et al. |
| 5,262,458 A | 11/1993 | Bastioli et al. |
| 5,314,934 A | 5/1994 | Tomka |
| 5,449,708 A | 9/1995 | Schiltz |
| 5,461,093 A | 10/1995 | Yoo et al. |
| 5,462,983 A | 10/1995 | Bloembergen et al. |
| 5,510,401 A | 4/1996 | Dehennau et al. |
| 5,714,445 A | 2/1998 | Trinh et al. |
| 6,211,325 B1 | 4/2001 | Sun et al. |
| 6,472,497 B2 | 10/2002 | Loercks et al. |
| 6,605,657 B1 | 8/2003 | Favis et al. |
| 6,709,526 B1 | 3/2004 | Bailey et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 | 10/2009 | Sun et al. |
| 7,666,261 B2 | 2/2010 | Bailey et al. |
| 7,740,952 B2 | 6/2010 | Hausmann et al. |
| 7,998,888 B2 | 8/2011 | Shi et al. |
| 8,188,185 B2 | 5/2012 | Wang et al. |

(Continued)

FOREIGN PATENT DOCUMENTS

| | | |
|---|---|---|
| CA | 1031088 A | 5/1978 |
| CN | 1312838 A | 9/2001 |
| CN | 1603361 A | 4/2005 |
| CN | 101589097 A | 11/2009 |

(Continued)

OTHER PUBLICATIONS

Machine translation of CN 103087482 (Year: 2013).*

(Continued)

*Primary Examiner* — Wenwen Cai

(74) *Attorney, Agent, or Firm* — Workman Nydegger

(57) ABSTRACT

Composite blends of PBAT (or another similar polyester) with PLA and a carbohydrate-based polymeric material. While PLA is not compostable under home composting conditions (e.g., temperature of 28° C.) on its own, when blended in the manner described herein, it is compositable under such conditions. The addition of the PLA increases the rigidity of the composite blend, as PBAT on its own is so flexible as to be problematic for use in carryout bags, and the like. An exemplary blend may include 30-55% by weight of the carbohydrate-based polymeric material, up to 20%, or up to 15% by weight of PLA, with the balance of polymeric content being PBAT (e.g., 30-60% PBAT). Other components (e.g., an inorganic filler, such as calcium carbonate) may also be included in the blend.

25 Claims, 13 Drawing Sheets

(56) References Cited

U.S. PATENT DOCUMENTS

| | | |
|---|---|---|
| 8,232,348 B2 | 7/2012 | Changping |
| 8,283,006 B2 | 10/2012 | Wang et al. |
| 8,329,501 B1 | 12/2012 | Robinson et al. |
| 8,329,601 B2 | 12/2012 | Shi et al. |
| 8,466,337 B2 | 6/2013 | Wang et al. |
| 8,802,754 B2 | 8/2014 | Nie et al. |
| 8,807,254 B2 | 8/2014 | Manus |
| 8,889,945 B2 | 11/2014 | Wang et al. |
| 8,927,611 B2 | 1/2015 | Voolapalli et al. |
| 8,927,617 B2 | 1/2015 | Funk et al. |
| 8,969,224 B2 | 3/2015 | Masuda et al. |
| 9,056,968 B2 | 6/2015 | Matsuo |
| 9,273,207 B2 | 3/2016 | Bastioli |
| 9,327,438 B2 | 5/2016 | Wang et al. |
| 9,464,188 B2 | 10/2016 | Wang et al. |
| 9,884,471 B2 | 2/2018 | Neuman et al. |
| 10,131,783 B2 | 11/2018 | Schmidt et al. |
| 10,214,634 B2 | 2/2019 | Lapray et al. |
| 10,239,292 B2 | 3/2019 | Nissenbaum et al. |
| 10,752,759 B2 | 8/2020 | Lapray et al. |
| 10,919,203 B2 | 2/2021 | Lapray et al. |
| 10,920,044 B2 | 2/2021 | Lapray et al. |
| 2002/0006989 A1 | 1/2002 | Bastioli et al. |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0119949 A1 | 6/2003 | Favis et al. |
| 2003/0166779 A1 | 9/2003 | Khemani |
| 2007/0129468 A1 | 6/2007 | Bastioli et al. |
| 2008/0103232 A1 | 5/2008 | Lake et al. |
| 2008/0287592 A1 | 11/2008 | Favis et al. |
| 2009/0042468 A1 | 2/2009 | Suzuki et al. |
| 2009/0048368 A1 | 2/2009 | Bash et al. |
| 2010/0115836 A1 | 5/2010 | Julian |
| 2010/0159777 A1 | 6/2010 | Wang et al. |
| 2010/0311874 A1 | 12/2010 | Mentink et al. |
| 2011/0287929 A1 | 11/2011 | Smith et al. |
| 2012/0059097 A1 | 3/2012 | Liao et al. |
| 2012/0139154 A1 | 6/2012 | Huneault et al. |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0157031 A1 | 6/2013 | Wang et al. |
| 2013/0157032 A1 | 6/2013 | Wang et al. |
| 2014/0011921 A1 | 1/2014 | Bash et al. |
| 2014/0079935 A1 | 3/2014 | Broyles |
| 2014/0272370 A1 | 9/2014 | Broyles et al. |
| 2015/0045454 A1 | 2/2015 | Kong et al. |
| 2016/0107426 A1 | 4/2016 | Leufgens |
| 2017/0002184 A1 | 1/2017 | Lapray et al. |
| 2017/0002185 A1 | 1/2017 | Lapray et al. |
| 2017/0210889 A1 | 7/2017 | Lapray et al. |
| 2017/0218184 A1 | 8/2017 | Lapray et al. |
| 2017/0283597 A1 | 10/2017 | Lapray et al. |
| 2017/0355179 A1 | 12/2017 | Sehanobish et al. |
| 2017/0362418 A1 | 12/2017 | Lapray et al. |
| 2018/0100060 A1 | 4/2018 | Lapray et al. |
| 2019/0194426 A1 | 6/2019 | Lapray et al. |
| 2019/0256681 A1 | 8/2019 | Lapray et al. |
| 2019/0276664 A1 | 9/2019 | Lapray et al. |
| 2019/0315942 A1 | 10/2019 | Lapray et al. |
| 2019/0315947 A1 | 10/2019 | Lapray et al. |
| 2019/0330770 A1 | 10/2019 | Shi et al. |
| 2020/0339781 A1 | 10/2020 | Lapray et al. |
| 2020/0339784 A1 | 10/2020 | Lapray et al. |
| 2020/0377705 A1 | 12/2020 | Lapray et al. |
| 2021/0269944 A1 | 9/2021 | Allen et al. |
| 2021/0277207 A1 | 9/2021 | Allen et al. |
| 2021/0277556 A1 | 9/2021 | Allen et al. |
| 2021/0324186 A1 | 10/2021 | LaPray et al. |
| 2021/0363335 A1 | 11/2021 | LaPray et al. |

FOREIGN PATENT DOCUMENTS

| | | | |
|---|---|---|---|
| CN | 101805499 A | 8/2010 | |
| CN | 101932647 A | 12/2010 | |
| CN | 102066467 A | 5/2011 | |
| CN | 102153786 A | 8/2011 | |
| CN | 102329436 A | 1/2012 | |
| CN | 102639594 A | 8/2012 | |
| CN | 102850626 A | 1/2013 | |
| CN | 103087482 A * | 5/2013 | ............. B29C 48/40 |
| CN | 103289165 A | 9/2013 | |
| CN | 103627153 A | 3/2014 | |
| CN | 103819794 A | 5/2014 | |
| CN | 103987504 A | 8/2014 | |
| CN | 103998195 A | 8/2014 | |
| CN | 105531115 A | 4/2016 | |
| CN | 105670239 A | 6/2016 | |
| CN | 105966014 A | 9/2016 | |
| CN | 107793619 A | 3/2018 | |
| CN | 107922662 A | 4/2018 | |
| CN | 108276744 A | 7/2018 | |
| EP | 0326517 A1 | 8/1989 | |
| EP | 0497706 A1 | 8/1992 | |
| EP | 1930487 A1 | 6/2008 | |
| EP | 2762307 A1 | 8/2014 | |
| GB | 2272699 A | 5/1994 | |
| JP | 49-055740 A | 5/1974 | |
| JP | 50-086543 A | 7/1975 | |
| JP | 04-202567 A | 7/1992 | |
| JP | 07-126449 A | 5/1995 | |
| JP | 07-258488 A | 10/1995 | |
| JP | 09-041224 A | 2/1997 | |
| JP | 10-259083 A | 9/1998 | |
| JP | 11-322962 A | 11/1999 | |
| JP | 2003-073539 A | 3/2003 | |
| JP | 2003-518541 A | 6/2003 | |
| JP | 2004-202567 | 7/2004 | |
| JP | 3539955 B2 | 7/2004 | |
| JP | 2005-089718 A | 4/2005 | |
| JP | 2005-264111 A | 9/2005 | |
| JP | 2008-013602 A | 1/2008 | |
| JP | 2009-185305 A | 8/2009 | |
| JP | 2010-150305 A | 7/2010 | |
| JP | 2010-260923 A | 11/2010 | |
| JP | 2011-042032 A | 3/2011 | |
| JP | 2011-511121 A | 4/2011 | |
| JP | 2011-213836 A | 10/2011 | |
| JP | 2012-148507 A | 8/2012 | |
| JP | 2013-147609 A | 8/2013 | |
| JP | 5544303 B2 | 7/2014 | |
| JP | 2018-502744 A | 2/2018 | |
| JP | 2018-525467 A | 9/2018 | |
| TW | 201538529 A | 10/2015 | |
| WO | 01/48078 A1 | 7/2001 | |
| WO | 03/14164 A1 | 2/2003 | |
| WO | 2006/116861 A1 | 11/2006 | |
| WO | 2007/027163 A2 | 3/2007 | |
| WO | 2009/073197 A1 | 6/2009 | |
| WO | 2009/103052 A1 | 8/2009 | |
| WO | 2011/020170 A1 | 2/2011 | |
| WO | 2012/088585 A1 | 7/2012 | |
| WO | 2013/116945 A1 | 8/2013 | |
| WO | 2014/089321 A1 | 6/2014 | |
| WO | 2014/190395 A1 | 12/2014 | |
| WO | 2014/190935 A1 | 12/2014 | |
| WO | 2015/028943 A1 | 3/2015 | |
| WO | 2016/109196 A1 | 7/2016 | |
| WO | 2016/134994 A1 | 9/2016 | |
| WO | 2016/198652 A1 | 12/2016 | |
| WO | 2018/125897 A1 | 7/2018 | |
| WO | 2018/187784 A1 | 10/2018 | |
| WO | 2019/043134 A1 | 3/2019 | |
| WO | 2019/108056 A1 | 6/2019 | |

OTHER PUBLICATIONS

Ibbrucker, Constance "Oxo-degradable plastics increasingly under fire in Europe" European Bioplastics, http://www.european-bioplastics.

(56) References Cited

OTHER PUBLICATIONS org/oxo-degradable-plastics-increasingly-under-fire-in-europe/ Feb. 28, 2017, 5 pages.
IDS Statement filed Aug. 21, 2020 in U.S. Appl. No. 16/999,542.
International Search Report issued in PCT Application PCT/US2019/28733, dated Mar. 9, 2019.
Jie Ren "Preparation, characterization and properties of binary and ternary blends with thermoplastic starch, poly (lactic acid) and poly(butylene adipate-co- terephthalate)," Elsevier, Carbohydrate Polymers, 2008, pp. 576-582.
Kalambur, et al. "An Overview of Starch-Based Plastic Blends From Reactive Extrusion" Journal of Plastic Film and Sheeting, 2006, vol. 22, pp. 39-58.
Li, Gang, et al., "Biodegradation of Thermoplastic Starch and its Blends with Poly(lactic acid) and Polyethylene Influence of Morphology" published in Macromolecular Journals of Chemistry and Physics, 2011 pp. 1147-1154.
Luo, Ying, et al. "Accelerating the degradation of polyethylene composite mulches." Plastics Research Online, May 19, 2017. Society of Plastics Engineers (SPE), DOI: 10 2417/spepro.006909 Accessed Apr. 20, 2018.
Marianne Shirai "Thermoplastic starch/polyester films: Effects of extrusion process and poly (lactic acid) addition," Elsevier, Materials Science and Engineering, 2013, pp. 4112-4117.
Meereboer et al., "Review of recent advances in the biodegradability of polyhydroxyalkanoate (PHA) bioplastics and their composites," Green Chem , vol. 22, 2020, pp. 5519-5558.
Ming et al, CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Non-Final Office Action received for U.S. Appl. No. 15/691,588, dated Sep. 24, 2020, 10 pages.
Notice of Allowance received for U.S. Appl. No. 15/628,379, dated Oct. 3, 2018.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 28, 2017, LaPray et al., "Articles Formed with Biodegradable Materials and Strength Characteristics of Same", 13 pages.
Office action for U.S. Appl. No. 14/853,725, :leApr. 30, 2018, LaPray et al., "Articles Formed with Biodegradable Materials and Strength Characteristics of Same", 19 pages.
Office Action for U.S. Appl. No. 14/853,725, dated Oct. 12, 2018, LaPray et al., "Articles Formed with Biodegradable Materials and Strength Characteristics of Same", 13 pages.
Office Action received for U.S. Appl. No. 15/481,806, dated Apr. 30, 2018.
Office Action received for U.S. Appl. No. 15/481,823, dated Apr. 30, 2018.
Office Action received for U.S. Appl. No. 15/691,588, dated Apr. 30, 2018.
Office Action received for U.S. Appl. No. 15/836,555, dated Aug. 12, 2019.
Office Action received for U.S. Appl. No. 15/691,588, dated May 10, 2019.
Office Action received for U.S. Appl. No. 14/853,780, dated Aug. 10, 2018.
Office Action received for U.S. Appl. No. 14/853,780, dated Feb. 28, 2019.
Office Action received for U.S. Appl. No. 14/853,780, dated Nov. 6, 2017.
Office Action received for U.S. Appl. No. 14/853,780, dated Oct. 12, 2016.
Office Action received for U.S. Appl. No. 15/481,806, dated Feb. 28, 2019.
Office Action received for U.S. Appl. No. 15/481,806, dated Jul. 29, 2020.
Office Action received for U.S. Appl. No. 15/481,806, dated Oct. 12, 2018.
Office Action received for U.S. Appl. No. 15/481,823, dated Dec. 9, 2019.
Office Action received for U.S. Appl. No. 15/481,823, dated Feb. 28, 2019.
Office Action received for U.S. Appl. No. 15/628,379, dated Apr. 30, 2018.
Office Action received for U.S. Appl. No. 15/691,588, dated Jan. 2, 2019.
Office Action received for U.S. Appl. No. 15/836,555, dated Jul. 14, 2020.
Office Action received for U.S. Appl. No. 16/287,884, dated Jul. 30, 2020.
Office Action received for U.S. Appl. No. 16/391,909 , dated Dec. 1, 2020.
Office Action received for U.S. Appl. No. 16/456,295, dated Jul. 22, 2020.
Office Action received for U.S. Appl. No. 16/456,303, dated Apr. 9, 2020.
Ohtake, et al., "The Biodegradability of Polyethylene", Material Life, vol. 6, Issue 3, 1994, pp. 125-133.
Ojeda, et al., "Degradability of linear polyolefins under natural weathering, Polymer Degradation and Stability," 2011, pp. 703-707.
Ojeda, Telmo, et al., "Polymer Degradation and Stability" Available as early as Dec. 16, 2010 at www.elsevier.com/locat/polydegstab, 5 pages.
Oluz, Zehra and Teoman Tincer, "Additives for ultraviolet-induced oxidative degradation of low-density polyethylene", J. Appl. Polym. Sci., 133, 43354, Jan. 18, 2016, Wiley Online Library, DOI: 10.1002/app.43354, Accessed Apr. 21, 2018.
PCT International Search Report and the Written Opinion for Application No. PCT/US/U.S. Appl. No. 18/026,610, dated Jul. 13, 2018, 10 pages.
PCT International Search Report and the Written Opinion for Application No. PCT/US17/68492, dated Mar. 16, 2018, 10 pages.
PCT Search Report and Written Opinion dated Sep. 14, 2016 for PCT Application No. PCT/US16/40092, 8 pages.
PCT Search Report and Written Opinion dated Sep. 15, 2016 for PCT Application No. PCT/US 16/40104, 10 pages.
Pearce "Biodegradable plastic bags carry more ecological harm than good" The Guardian, Jun. 18, 2009.
Requirement for Restriction/Election received for U.S. Appl. No. 16/391,909, dated Sep. 8, 2020.
Ruchuan et al., "Study On Starch-Polyethylene Film", Journal of Tianjin University, No. 2, 1990, pp. 23-29.
S.K. Nayak "Biodegradable PBAT/Starach Nanocomposites" Polymer-Plastics Technology and Engineering, 2010, pp. 1406-1418.
Santos, R. A. L. et al,, "Starch/Poly (Butylene Adipate-Co-Terephthalate)/Montmorillonite Films Produced By Blow Extrusion". Quim. Nov. 2014, 37(6), 937-942. (Year: 2014).
Sashiwa et al., "Microbial Degradation Behavior in Seawater of Polyester Blends Containing Poly(3-hydroxybutyiaLe-co-3-hydroxyhexanoate) (PHBHHx)," Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process," Department of Mechanical and Industrial Engineering, 2019, 89 pages.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.

(56) References Cited

OTHER PUBLICATIONS

Shogren et al. "Biodegradation of starch/polylactic acid/poly(hydroxyester-ether) composite bars in soil" Polymer Degradation and Stability 79 (2003) 405-41 1.

Sumathi, Tirupati et al, "Production of Laccase By *Cochliobolus* sp. Isolated from Plastic Dumped Soils and Their Ability to Degrade Low Molecular Weight PVC", Biochemistry Research International 2016 (2016): 9519527. PMC. Web. Apr. 16, 2018.

Tang, et al., "Recent Advances in Starch, Polyvinyl Alcohol Based Polymer Blends, Nanocomposites and their Biodegradability" Carbohydrate Polymers, 2011, vol. 85, pp. 7-16.

Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.

Thakore, I.M., et al., "Studies on Biodegradability, morphology and thermo-mechanical properties of LDPE/modified starch blends" published in The European Polymer Journal, vol. 37 2001, pp. 151-160.

The SPC Position Against Biodegradability Additives for Petroleum-Based Plastics Sustainable Packaging Coalition, http://www.sustainablepackaging.org/content/?type=5&id=position-against-biodegradability-additives-for-petroleum-based-plastics Retreived on Sep. 19, 2017, 5 pages.

Thryft, Ann R, "Biodegradable Plastics Standard to Bust Landfill Waste", ENSO Plastics, Nov. 15, 2011. http://ensoplastics.com/theblog/?p=535, Accessed Apr. 23, 2018.

Tokiwa, et al., "Biodegradability of Plastics" in the International Journal of Molecular Sciences, Aug. 26, 2009, vol. 10, pp. 3722-3742.

Transition Metal Salts, Oxo-biodegradable Plastics Association, http://www.biodeg.org/index.html. Accessed Apr. 20, 2018.

Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.

U.S. Appl. No. 15/481,823, filed Apr. 7, 2017, LaPray.

U.S. Application filed Apr. 7, 2017, by LaPray, U.S. Appl. No. 15/481,806.

U.S. Application filed Apr. 23, 2019, by LaPray, U.S. Appl. No. 16/391,909.

U.S. Application filed Aug. 21, 2020, by LaPray, U.S. Appl. No. 16/999,542.

U.S. Application filed Aug. 30, 2017, by LaPray., U.S. Appl. No. 15/691,588.

U.S. Application filed Feb. 27, 2019, by LaPray, U.S. Appl. No. 16/287,884.

U.S. Application filed Jun. 20, 2017, by LaPray, U.S. Appl. No. 15/628,379.

U.S. Patent Application filed Jul. 10, 2020 by LaPray, U.S. Appl. No. 16/925,705.

U.S. Patent Application filed Jul. 10, 2020 by LaPray, U.S. Appl. No. 16/925,747.

Van Soest et al. "Crystallinity in Starch Plastics: Consequences for Material Properties" Trends in Biotechnology, vol. 15, No. 6, Jun. 1, 1997, pp. 208-213.

Vargha et al., "Behavior of Polyethylene Films in Soil, Periodica Polytechnica Chemical Engineering," DOI: 10.3311/PPch. 8281, Creative Commons Attribution, 2016, pp. 60-68.

Vargha, et al., "Behavior of Polyethylene Films in Soil" published in Periodica Polytechnica Chemical Engineering, Nov. 5, 2015 pp. 60-68.

Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.

Yoshida, et al., "A Bacterium that Degrades and Assimilates Poly(ehylene terphthalate)" Sciense Magazine vol. 351 Issue 6278 Mar. 11, 2016 pp. 1196-1199.

Yu et al., "Morphology and Mechanical Properties of Immiscible Polyethylene/Polyamide12 Blends Prepared by High Shear Processing," Chinese Journal of Polymer Science, 2017, 35(9):1132-1142.

Zhang et al., "Retrogradalion and Antiplasticization of Thermoplastic Starch," Richardson Centre for Functional Foods and Nutraceuticals, University of Manitoba, www.intechopen.com, 19 pages. 2012.

Zhang, et al. "Retrogradation and Antiplasticization of Thermoplastic Starch" Mar. 2012.

Zhong et al., "Biodegradable polymers and green-based antimicrobial packaging materials: A mini-review," Advanced Industrial and Engineering Polymer Research, vol. 3, 2020, pp. 27-35.

"APR Position Statement—Degradable Additives Use in Bottles, Forms and Films" The Association of Postconsumer Plastic Recyclers, http://plasticsrecycling.org/about/position-statements, Apr. 27, 2015, 1 page.

"Background on Biodegradable Additives" BPI, Feb. 12, 2010.

"BPI Position on Degradable Additives" Feb. 2010, 6 pages.

"Case Study: Compostable vs Oxo Degradable" Natur Bag, Feb. 19, 2019.

"Compostable Plastics 101: An Overview of Compostable Plastics Sponsored by the California Organics Recycling Council" based on information and belief, available at least as early as 2012, 23 pages.

"Discover Polysaccharides" Available at http://polysac3db.cermav.cnrs.fr/discover_starch.html; Accessed Feb. 16, 2017, 10 pages.

"Environmentally Degradable Plastics," Leonardo Da Vinci Program, Contract Nol 1/98/2/05261 /PI/11.1.1.b/CONT, 202 pages. May 4, 1999.

"French Proposal for Law on Biodegradable Plastics" Oxo-Biodegradable Plastics Association, Revised Oct. 31, 2013.

"Oxo-Biodegradable' Plastics and Other Plastics with Additives for Degradation" European Bioplastics BackGround Oct. 2015, 5 pages.

"Position Paper on Degradable Additives" SPI Bioplastics Division, issued Feb. 2016.

"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.

"The Flexible Packaging Association Position on Degradable Additives" FPA, Jun. 21, 2010.

"What Are Oxo-biodegradable Additives" MJS Packaging, May 8, 2014.

"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.

Ahmed et al. "Biodegradation of plastics: current scenario and future prospects for environmental safety." Environmental Science and Pollution Research 25.8 7287-7298. p. 7 col. 1 paragraph 2; Table 1; and Figure 1., Mar. 2018.

Applicant's Transmittal Letter labeled Information Disclosure Statement Under 37 CFR 1.97 dated Sep. 26, 2018.

Arevalo-Nino et al., "Starch-based extruded plastic films and evaluation of their biodegradable properties" Biodegradation 7:231-237, 1996.

Arvanitoyannis et al., Biodegradable films made from low density polyethylene (LDPE), rice starch and potato starch for food packaging applications: Part 1, Carbohydrate Polymers, vol. 36, (1998), pp. 89-104.

Bastioli et al. "Starch in Polymers Technology" ACS Symposium Series, Jan. 1, 2012, American Chemical Society/Oxford University Press, XP055490447, vol. 1114, pp. 87-112.

Biodegradable Plastics Standard to Bust Landfill Waste, ENSO Plastic Blog, printed Feb. 20, 2019, 3 pages.

Braskem "Life Cycle Assessment of Green Plastic" Available as early as Mar. 28, 2017, accessed at http://www.braskem.com_site.aspx_plastic-green, 18 pages.

Campo, E. Alfredo, Polymeric Materials and Properties, Science Direct, 2018.

Cardia Biohybrid, Film Blowing/ Blow Moulding Resin, Sep. 8, 2017.

Cardia Bioplastics FAQ [online] [site accessed Oct. 23, 20 18] URL: http://www.cardiabioplastics.com/our-business/faq.

(56) References Cited

OTHER PUBLICATIONS

Cardia Compostable B-F, Blown Film Resin, Biodegradable during Composting in Professionally Managed Facilities, CBP Technical Data Sheet, 110317, 2 pages. 2019.
Chen et al. "Environmental Degradation of Starch/Poly (Lactic Acid) Composite in Seawater" Apr. 6, 2010.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Com Starch/Fisher Scientific, 3 pages [online] [site accessed Sep. 18, 2020] url: https://www.fishersci.com/shop/products/corn-starch-2/S25580 (undated).
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Droge et al, WO 2016/134994 Machine Translation, Sep. 1, 2016 (Year: 2016).
Emmanuel Schwach "Starch-based biodegradable blends: morphology and interface properties," Polymer International, 2004, pp. 2115-2124.
English Abstract of BY 21006 C1. Apr. 2017.
Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.
Eyheraguibel, et al. "Characterization of oxidized oligomers from polyethylene films by mass spectrometry and NMR spectroscopy before and after biodegradation by a Rhodococcus rhodochrous strain" Chemosphere 184,2017, pp. 366-374.
Final Office Action received for U.S. Appl. No. 14/853,725, dated Nov. 8, 2017.
Final Office Action received for U.S. Appl. No. 14/853,780, dated May 24, 2017.
Final Office Action received for U.S. Appl. No. 15/481,806, dated Nov. 6, 2019.
Final Office Action received for U.S. Appl. No. 15/481,823, dated Jul. 12, 2019.
Final Office Action received for U.S. Appl. No. 15/481,823, dated Jul. 20, 2020.
Final Office Action received for U.S. Appl. No. 15/481,823, dated Oct. 12, 2018.
Final Office Action received for U.S. Appl. No. 15/691,588, dated Dec. 9, 2019.
Final Office Action received for U.S. Appl. No. 15/836,555, dated Feb. 7, 2020.
Final Office Action received for U.S. Appl. No. 15/836,555, dated Nov. 30, 2020, 27 pages.
Fine Chemical Engineering Green Production Process, I st edition, edited by Qihuang Song, Guangdong Science & Technology Press, published on Mar. 31, 2006, p. 174.
Fujisawa, et al. "Degradation of Polyethylene and Nylon 66 by the Laccase-Mediator System" Journal of Polymers and the Environment, vol. 9, Issue 3, 2001, pp. 103-108.
Gadhave et al., Starch Based Bio-Plastics: The Future of Sustainable Packaging, Open Journal of Polymer Chemistry, 2018, vol. 8, pp. 21-33.
Gilfillan, "Developing Starch-Based Polymer Composites", Doctor of Philosophy, 2015, pp. 1-128.

Gupta, Apeksha et al. "Visible Range Photocatalysts for Phase Photocatalytic Degradation of Polyethylene and Polyvinyl Chloride" Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Huagong et al., "Green Manufacturing Process of Fine Chemical Industry", 2006, Guangdong Science & Technology Press (National Outstanding Press).
Ibbrucker, Constance "Can Additives make plastics biodegradable?" Bioplastics Magazine Jan. 2017, 1 page.
Machine translation of JP-2008013602-A (Year: 2008).
Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
Examiner Interview Summary received for U.S. Appl. No. 15/836,555, dated Mar. 29, 2021, 2 pages.
Non-Final Office Action received for U.S. Appl. No. 15/836,555, dated Apr. 13, 2021, 12 pages.
Non-Final Office Action received for U.S. Appl. No. 16/425,397, dated Feb. 5, 2021, 13 pages.
Notice of Allowance received for U.S. Appl. No. 15/691,588, dated Feb. 24, 2021, 11 pages.
Notice of Allowance received for U.S. Appl. No. 15/836,555, dated May 3, 2021, 6 pages.
Notice of Allowance received for U.S. Appl. No. 16/391,909, dated May 4, 2021, 9 pages.
"Mask fire, environmental protection fire, degradable meltdown cloth will be the next tueyere?", https://mp.weixin.qq.eom/s/r5PmKPpF1V2TkW9AYZQ2EA, Jun. 3, 2020.
"Succeeded in developing a pregelatinized rice manufacturing device without cooking rice", Yamagata University press release material, Aug. 6, 2013. Partial English translation provided.
Frankland, Jim, Extrusion: Where's the Data? The Importance of Melt Strength in Extrusion, Plastics Technology, https://www.ptonline.com/articles/what-about-melt-strength, Dec. 18, 2020.
La Fuente, et al., Ozonation of Cassava Starch to Produce Biodegradable Films, Sep. 5, 2019, International Journal of Biological Macromolecules, 713-720, 141 (2019).
Non-Final Office Action received for U.S. Appl. No. 16/925,705, dated Aug. 11, 2021, 15 pages.
Non-Final Office Action received for U.S. Appl. No. 16/925,747, dated Aug. 11, 2021, 15 pages.
Notice of Allowance received for U.S. Appl. No. 16/425,397, dated Jun. 18, 2021, 8 pages.
Sumathi et al., "Production of laccase by *Cochliobolus* sp. isolated from plastic dumped soils and their ability to degrade low molecular weight PVC," Biochemistry research international 2016, vol. 2018, Jan. 1, 2016, pp. 1-10.
U.S. Appl. No. 15/481,823.
U.S. Appl. No. 16/925,705.
U.S. Appl. No. 16/925,747.
Final Office Action received for U.S. Appl. No. 16/925,705, dated Jan. 18, 2022, 12 pages.
Final Office Action received for U.S. Appl. No. 16/925,747, dated Jan. 18, 2022, 12 pages.

\* cited by examiner

POLYMERIC ARTICLES COMPRISING BLENDS OF PBAT, PLA AND A CARBOHYDRATE-BASED POLYMERIC MATERIAL

CROSS-REFERENCE TO RELATED APPLICATIONS

This application claims the benefit of U.S. Application Nos. 62/872,589 and 62/875,872, filed Jul. 10, 2019 and Jul. 18, 2019, respectively. This application is also a continuation-in-part of U.S. application Ser. No. 16/425,397 filed on May 29, 2019, which claims the benefit of U.S. Application No. 62/677,368 filed on May 29, 2018. U.S. application Ser. No. 16/425,397 is also a continuation in part of U.S. application Ser. No. 15/691,588 filed on Aug. 30, 2017 which is a continuation in part of U.S. application Ser. No. 14/853,725 filed on Sep. 14, 2015 which claims the benefit of U.S. Provisional Patent Application No. 62/187,231 filed on Jun. 30, 2015. U.S. application Ser. No. 15/691,588 is also a continuation in part of U.S. application Ser. No. 14/853,780 filed on Sep. 14, 2015, and a continuation in part of U.S. application Ser. Nos. 15/481,806 and 15/481,823, both filed on Apr. 7, 2017. U.S. application Ser. No. 15/691,588 also claims the benefit of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein.

Other applications are also incorporated herein by reference. For example, each of U.S. Application No. 62/483,219 filed Apr. 7, 2017; U.S. application Ser. No. 15/836,555 filed Dec. 8, 2017; U.S. Provisional Patent Application No. 62/483,109, filed Apr. 7, 2017; U.S. Application No. 62/610,615 and Ser. No. 16/456,303 filed Dec. 27, 2017 and Jun. 28, 2019, respectively; U.S. Application No. 62/610,618 and Ser. No. 16/456,295 filed Dec. 27, 2017 and Jun. 28, 2019, respectively; U.S. application Ser. No. 16/391,909 filed Apr. 23, 2019; U.S. Application No. 63/033,676 filed Jun. 2, 2020; PCT Application No. PCT/US2017/068492 filed Dec. 27, 2017; and 2 additional Non-Provisional patent applications of Applicant, bearing Ser. Nos. 16/925,705, 16/925,747, filed the same day as the present application, is each incorporated by reference in its entirety herein.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean. In trying to reduce the amount of plastic waste, some articles typically produced using petrochemical-based plastics are being produced using bioplastic materials which are defined as plastic that is made from renewable resources, or that is biodegradable.

Petrochemical-based plastics materials, such as large quantities of polyethylene and polypropylene, as well as numerous other plastics (polyethylene terephalate, polystyrene, ABS, polyvinyl chloride, polycarbonate, nylon, and the like) are typically not readily biodegradable in typical land disposal environments (e.g., in a landfill), or even more so, when discarded in a marine environment. Such is typically the case even for so called "green" plastics of such materials, where a fraction of the plastic may be sourced from renewable or sustainable sources, rather than petro-chemical feedstocks.

There do exist some specialty plastic materials that can exhibit some degree of compostability and/or biodegradability under some disposal conditions. For example, polylactic acid ("PLA") and polybutyrate adipate terephthalate ("PBAT") (also known as poly(butylene adipate-co-terephthalate)) have been shown to exhibit some degree of compostability in industrial compost conditions. While such disposal conditions can allow for some biodegradability of PLA or PBAT under some such conditions where composting temperature is elevated (e.g., 58° C.), PLA does not exhibit compostablity in a typical home composting environment, where the composting temperature is significantly lower. In other words, while PBAT may exhibit some biodegradability under such home compost disposal conditions, (e.g., such as under EN13432, at 28° C.), PLA does not exhibit any significant biodegradation when disposed of in such an environment. Furthermore, PBAT itself is a very flexible material, exhibiting so much flexibility that if one places items into a bag formed of PBAT, it may flex significantly under the applied load, making it not particularly suitable for use alone in a bag or other film material. While PLA is more rigid, it does not exhibit the desired home compostability characteristics.

It would be an improvement in the art to provide films that could address at least some of the above identified problems.

SUMMARY

This disclosure is directed to polymeric blends suitable for use as films or rigid materials (e.g., depending on thickness) that meet home compostability requirements. The blend includes a carbohydrate-based polymeric material (e.g., a modified polysaccharide, such as NuPlastiQ, available from applicant), blended with PBAT and PLA. While NuPlastiQ and PBAT will typically biodegrade in a home compost environment, PLA does not. Even when blended with just PBAT, the PLA similarly does not biodegrade under home compost conditions. However, with the inclusion of the NuPlastiQ in the blend, the PLA will biodegrade under home compost conditions (e.g., at 28° C., with the conditions otherwise as dictated by EN13432).

Film materials including PBAT would be desirable for use in applications such as carry-out bags, where unfortunately, considerable littering still occurs, even in the U.S. and other developed nations. The rationale for using PBAT in such articles would be that PBAT exhibits biodegradability characteristics, e.g., even under relatively low temperature home composting conditions. By comparison, the vast majority of such carry-out bags (and other film articles) are formed from polyethylene, which exhibits negligible biodegradability under essentially any standardized testing or real world disposal conditions. The problem with using PBAT in such films is that PBAT is extremely elastomeric, e.g., to the degree that a bag formed from PBAT may actually stretch significantly when various items are loaded into the interior of the bag, rather than the bag generally retaining its shape, and holding the items. Such characteristics are of course problematic for carry-out bags, or other film articles, as well as other non-film articles where increased strength and rigidity may be desired, with lower overall flexibility and toughness.

By blending the PBAT with PLA, the rigidity of the resulting material is increased, so that the blend can be used to form films for use as carry-out bags, or other articles where a good balance of strength, stiffness, flexibility, and toughness are desired. The problem with such PLA addition is that the PLA in such a blend is not biodegradable under low temperature "home" composting conditions (similar to ASTM D-5338, but at 28° C.±2° C., e.g., as dictated by EN13432), resulting in a film or other article that only partially biodegrades (i.e., the PBAT will biodegrade, but the PLA will not).

Applicant has discovered that by adding Applicant's NuPlastiQ material, not only does the PBAT in the blend biodegrade under such low temperature home composting conditions, but that the PLA now also biodegrades under such lower temperature conditions. Of course, the NuPlastiQ carbohydrate-based polymeric material also biodegrades, so that all polymeric materials in such a blend then exhibit compostability under low temperature home composting conditions. Such a result is particularly advantageous.

In addition, the NuPlastiQ material is formed from renewably sourced components (e.g., starch and glycerin), and is relatively inexpensive by comparison to the other polymeric materials included in the blend (e.g., PBAT and PLA). At least some of the components used to produce the PBAT (e.g., butanediol, adipic acid, terephthalic acid) or PLA (e.g., lactic acid) may also be formed from renewably sourced components.

Where PBAT exhibits low stiffness, high flexibility, and/or high toughness (and low strength), it benefits from blending with PLA or the like for increased rigidity, where a carbohydrate-based or starch-based polymeric material like NuPlastiQ is also included in the blend, which ensures that all polymeric materials in the blend are compostable. In an embodiment, the present blends include a first polyester plastic material having a first stiffness (e.g., comprising PBAT), a second polyester (e.g., comprising PLA), where the first polyester plastic material has a stiffness that is less (and/or a flexibility that is greater) than that of the second polyester (e.g., PLA). The blend also includes the carbohydrate-based polymeric material.

An exemplary embodiment may include a blend of PBAT in an amount of at least 30% by weight of the blend, PLA in an amount of up to 20% by weight of the blend, and a carbohydrate-based polymeric material included in an amount of up to 60%, such as from 5% to 60%, or from 10% to 60% by weight of the blend. By way of example, the carbohydrate-based polymeric material may more typically be included in an amount of from 30% to 60% by weight of the polymer blend. The PLA may be present in an amount of up to 15%, or up to 12% by weight of the polymer blend, and the PBAT may make up the remainder of the polymeric content (e.g., 30-70% by weight). In an embodiment, the PLA may be present in an amount of at least 10%, or greater than 10% by weight of the blend. In addition to the polymeric components, an inorganic filler may also be included, such as calcium carbonate, talc, or the like. Inclusion of such a filler material may further reduce the amount of polymeric components needed in manufacture of a particular bag, other film, or other article, and may also aid in reducing any tendency of a bag formed from such a film to exhibit "blocking" or cohesion, where the sides of such a bag tend to adhere to one another, making it somewhat difficult to actually open the bag. In an embodiment, any such inorganic filler may be included in an amount from 0% to 30% by weight of the article, for example.

Any of various other additives may also be included, where desired, e.g., including but not limited to slip and/or processing aids.

Blends of such composite plastics may be processed according to a wide variety of known methods of manufacture for forming extruded plastic products, injection molded plastic products, blow molded plastic products, blown film plastic products, extruded or cast sheet or films, thermoformed plastic products, foamed plastic products, and the like.

Further features and advantages of the present invention will become apparent to those of ordinary skill in the art in view of the detailed description of preferred embodiments below.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

I. Definitions

Figure 1:
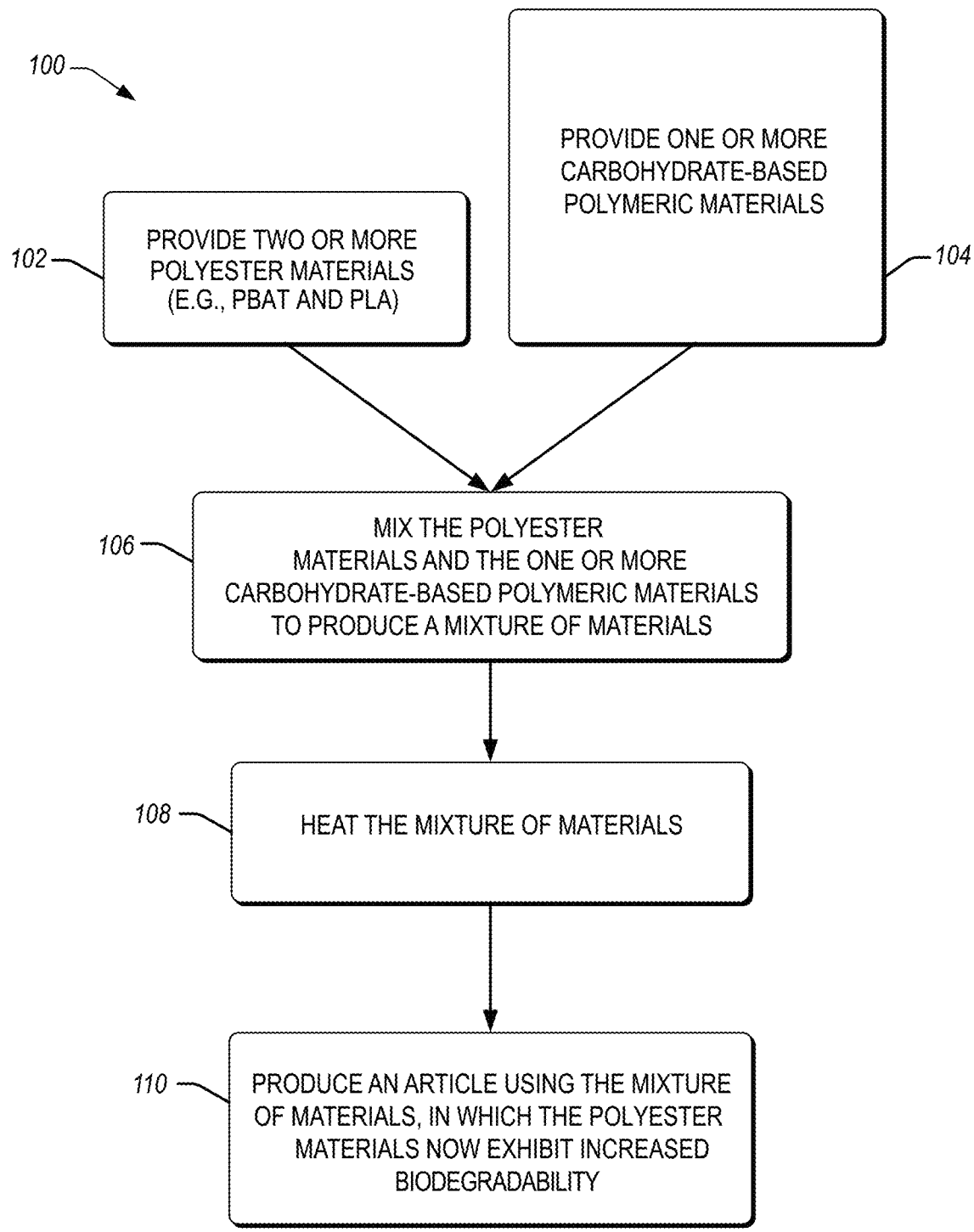
FIG. 1 illustrates a flow diagram of an exemplary process for forming an article according to the present invention.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight. Unless stated otherwise, molecular weight values are for weight average molecular weights.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. In an embodiment, the disclosed compositions may be free of any components not specifically disclosed as included therein.

The term "non-biodegradable" as used herein with regard to a material means that the native material (free of additives added to render it biodegradable) does not degrade (particularly biodegrade), e.g., to carbon dioxide and/or methane to a significant extent in a reasonable limited time period (e.g. one year, 3 years, or 5 years) when exposed to various simulated disposal conditions, (e.g., EN13432, ASTM D-5338, ASTM D-5511, and/or ASTM D-6691). As noted herein, the home compostability standard under EN13432 may be similar to that under ASTM D-5338, but carried out at lower temperature. In a similar manner, any other such standard may be modified (e.g., carried out at lower temperature) to evaluate biodegradability under more stringent conditions (e.g., home compostability vs. industrial compostability). It is further understood that given enough time and exposure to conditions of sunlight, oxygen and degrading microbes, most polymeric materials (e.g., even those that are typically considered "non-biodegradable") will eventually degrade or even biodegrade, usually to some limited extent, over an extended time (e.g., decades or centuries).

The term "biodegradable" as used herein with regard to a material means that the material which contains NuPlastiQ as described herein does biodegrade to base elements such as carbon dioxide, methane and/or water under conditions such as those described herein. Typical home compostability standards require at least 90% biodegradation of the polymeric content of the article within 365 days (i.e., reaching 90% biodegradation as measured under EN13432, at 28° C. (±2° C.), rather than at a higher temperature). Similar standards are applicable under other certification or regulatory authorities, e.g., such as the biodegradability and/or disintegration standards under ISO 20200 or various similar standards for home compostability (e.g., NF T51-800 (2015); AS 5810 (2010); or the OK Compost Home Certification scheme of TÜV Austria Belgium).

In reference to various standardized tests (e.g., ASTM or other tests), it will be understood that reference to any such standard refers to the latest update (if any) of such standard.

The term "modified" as used, e.g., in describing "modified starch" modified polysaccharide, and the like, refers to physical and/or chemical modifications, including the conversion of a starting starch material to one that includes a lower molecular weight. Such mechanical and/or chemical modifications may include mechanical modification of amylopectin starch component(s) to a more linear amylose structure. The foregoing descriptions are merely exemplary, and it will be appreciated that numerous modifications to such starch components are possible. Applicant's NuPlastiQ material is an example of a modified starch.

While the NuPlastiQ starch-based polymers described herein are an example of starch-based material that can provide the benefits described herein, it will be appreciated that the scope of the present invention extends broadly, to other starches or starch-based materials that might exhibit similar small particle size characteristics (e.g., developed at some future time), or even to a material that may be synthesized from starting materials other than starch, which may achieve similar results due to the presence of the same or similar chemical structures or functional groups. For example, if a material having a chemical structure similar or identical to NuPlastiQ were synthesized (e.g., in a reactor) starting from non-starch materials, such is also within the scope of the present invention.

II. Introduction

The present disclosure is directed to, among other things, blends of two polyester materials such as PBAT and PLA, with a carbohydrate-based (e.g., starch-based) polymeric material, where the blend increases the biodegradability of the PLA material within the blend.

For example, while PBAT is recognized to be readily biodegradable even under relatively low temperature ambient temperature composting conditions (e.g., "home composting conditions", as opposed to "industrial composting conditions", PLA does not exhibit such characteristics, and is not compostable in such relatively low temperature home composting conditions. This is so, even when blended with PBAT. For example, in such blends, the PBAT biodegrades, but the PLA largely remains in its initial form, such that such blends thereof do not meet home composting standards, e.g., such as the biodegradability and/or disintegration standards under ISO 20200 or various similar standards for home compostability (e.g., NF T51-800 (2015); AS 5810 (2010); or the OK Compost Home Certification scheme of TÜV Austria Belgium). Applicant has discovered that while PLA does not biodegrade under such conditions on its own, by homogeneously blending the PLA with particular carbohydrate-based (e.g., starch-based) polymeric materials available from Applicant, that the biodegradability of the PLA can be increased (e.g., in rate and/or extent), so that the overall blend will now in fact meet the applicable home compostability standards.

A further description of the requirements needed to meet "home compostability" standards is now provided. In order to meet applicable standards, the material must: (1) pass the heavy metals standards (i.e., none of the component materials of the blend (e.g., PBAT, PLA, or the carbohydrate-based polymeric material) include any prohibited heavy metal content; (2) meet the applicable biodegradation standard, whereby at least 90% of the blend biodegrades (as determined through the applicable respirometry test) within 365 days under such home composting conditions (e.g., at 28° C.±2° C.); (3) meet the applicable disintegration standards (e.g., at least 90% of the test material is reduced in size to less than 2 mm at ambient temperature (e.g., 28° C.±2° C.) within 26 weeks; and (4) meet the applicable ecotoxicity standards (i.e., each of the component materials of the blend (e.g., PBAT, PLA and the carbohydrate-based polymeric material) meet such ecotoxicity standard).

The present blends meet such standards, providing a viable alternative to polyethylene bags or other films that are not biodegradable to any significant degree, while addressing problems with the softness, extreme flexibility, and lack of sufficient rigidity for bags or other films formed entirely from PBAT, or limited biodegradability of bags formed of a blend of PBAT/PLA. The present blends can thus be used to form bags that provide good performance characteristics (e.g., good balance of strength, rigidity, flexibility, etc.), while ensuring that the home compostability standards described above are each met. Because the contemplated carbohydrate-based polymeric material (e.g., NuPlastiQ available from Applicant) is generally cost competitive with polyethylene (i.e., less expensive than PBAT and PLA), the blends and bags or other films formed therefrom can also be manufactured cost competitively (or even less expensively) than if a bag were formed only of PBAT and/or PLA.

Such blends are particularly beneficial in that they provide a viable alternative for manufacture of numerous plastic items, allowing such materials to advantageously biodegrade under home compost conditions within a reasonable time-frame, rather than existing in their plastic stable state indefinitely.

Furthermore, Applicant has observed that like paper, biodegradation of such articles does not readily occur where the articles are stored in typical storage and use environments (e.g., stored in a home, office, warehouse, or the like), but that biodegradation generally only begins to occur where the article is placed in an environment that simulates or is that of an aerobic or anaerobic digester, such as those conditions provided by the relevant ASTM or other biodegradability testing standards mentioned herein. For example, such conditions often include (i) a temperature that may be at least somewhat elevated above normal "use" or "storage" temperatures, (ii) exposure to elevated moisture levels, and (iii) exposure to particular classes of microbes indigent to the composting or similar disposal environment. Elevated temperature and moisture may cause degradation but will not cause biodegradation of such articles unless the necessary microorganisms are also present. The combination of such conditions causes the articles formed from such a blend of materials to begin to biodegrade. Third party testing as described herein confirms that not only is the carbohydrate-based polymeric material and the PBAT biodegrading under home compost conditions, but that the PLA also biodegrades under such moderate conditions, which PLA otherwise resists biodegradation under lower temperature (i.e., 28° C.) home composting conditions.

While the mechanisms by which such biodegradation of the PLA becomes possible upon blending with the carbohydrate-based polymeric material may not be completely understood, it is believed that blending the two polyester plastic materials together, with a high degree of homogeneity, coupled with perhaps particular characteristics of the carbohydrate-based polymeric material somehow breaks the hygroscopic barrier associated with the PLA, allowing the microbes that would biodegrade the carbohydrate-based polymeric material to not only biodegrade the carbohydrate-based polymeric material, but to also biodegrade the adjacent polyester linked PLA monomer units as well. The carbon and other bonds are being broken and the biodegradation is confirmed based on third party tests that capture and measure the carbon dioxide and methane that is off-gassed (i.e., respirometry-based tests). Such results are particularly advantageous. U.S. Application Nos. 62/872,582 and 62/939,460 filed Jul. 10, 2019 and Nov. 22, 2019 respectively, herein incorporated by reference in its entirety, includes additional description relative to the homogeneously blended, small particle starch characteristics of such blends.

Previous literature within the field shows that PLA is not particularly susceptible to biodegradation under ambient temperature home composting conditions, even though it exhibits biodegradation in industrial compost conditions (e.g., ASTM D-5338), where the temperature is significantly higher (e.g., 58° C. vs 28° C.).

It would clearly be advantageous to find a way to increase the rate and/or extent of biodegradability of PLA materials when disposed of in a home composting type environment, within a reasonable time frame (e.g., the 365 days applicable to the various standardized certification standards). For example, the present blends may include blends of PBAT and PLA, in combination with the carbohydrate-based polymeric material, to achieve improved physical properties through such blending, while also providing full home compostability of the resulting bag, film or other article.

Plastic articles can be produced by mixing the carbohydrate-based polymeric material with the two polyester plastic materials, heating the mixture, and molding (e.g., injection molding) the mixture, extruding the mixture, blow molding the mixture, blow-forming the mixture (e.g., forming a blown film), thermoforming the mixture, or the like. Various other plastic manufacturing processes will be apparent to those of skill in the art in light of the present disclosure, Applicant's other applications, and general knowledge of the art. Thermoset materials may similarly be blended (e.g., although heating may or may not be needed in such blending processes).

The articles described herein can be produced in the form of any conceivable structure, including, but not limited to bags, other films, as well as bottles, boxes, other containers, sheets, and the like. Thin films for bags and film wraps (e.g., for wrapping around or over a product) can easily be made using blown film equipment.

Examples of suitable carbohydrate-based or starch-based polymeric materials that have been shown to lend or increase biodegradability to polyester plastic materials exhibiting limited or no biodegradability are available from BiologiQ, under the tradename NuPlastiQ. Specific examples include but are not limited to NuPlastiQ GP and NuPlastiQ CG. Specific characteristics of such NuPlastiQ materials will be described in further detail herein. Other carbohydrate-based or starch-based polymeric materials may also be suitable for use so long as they are capable of, and specifically selected for the purpose of increasing biodegradability of the PLA material included in the blend. In order to select such a material for this purpose, its ability to lend or increase biodegradability of PLA must be recognized. Other than NuPlastiQ, Applicant is not currently aware of any such materials recognized to perform as such.

Applicant also provides masterbatch blends of NuPlastiQ and conventional polymeric materials under the tradename BioBlend, e.g., including, but not limited to, BioBlend XP, BioBlend XD, BioBlend MB, BioBlend BC, and BioBlend CB. Such masterbatches may contain higher proportions of the modified polysaccharide (NuPlastiQ) which may be down-blended with the other polymeric material(s) prior to forming the final product.

III. Exemplary Articles and Methods

FIG. 1 illustrates an exemplary process 100 that may be used according to the present invention. At 102, the process 100 can include providing two or more polyester plastic (e.g., polymeric) materials, e.g., particularly PBAT and PLA. While PBAT already exhibits home compostability characteristics, PLA does not, and blending with the carbohydrate-based polymeric materials as described herein imparts home biodegradability to the blend as a whole (by increasing the biodegradability of the PLA material). The presence of the carbohydrate-based polymeric material, as described herein, intimately dispersed with the polyester materials, may also enhance (e.g., rate and/or extent) biodegradability of the PBAT or other polyester material included in the blend. At 104, the process 100 can include providing one or more carbohydrate-based polymeric materials (e.g., NuPlastiQ). While other materials may also be suitable for use, in an embodiment, the selected carbohydrate-based polymeric material may be specifically selected for blending with the polyesters for its recognized ability to increase biodegradability of at least one of the polyester plastic materials (e.g., PLA) provided at 102. The one or more carbohydrate-based polymeric materials can include starch-based polymeric materials, although typical conventionally available carbohydrate-based polymeric materials will not necessarily result in a blend that will meet home compostability requirements. Applicant's NuPlastiQ material is an example of a particular carbohydrate-based polymeric material that will work as described herein. NuPlastiQ is also particularly suitable as it can be included while maintaining other desired physical properties, such as desired strength characteristics (e.g., particularly dart drop impact strength). The carbohydrate-based polymeric materials and the polyester plastic materials can be provided in a desired form, such as pellets, powders, nurdles, slurry, and/or liquids. In an embodiment, the materials can be in the form of pellets. The method further includes blending the polyester plastic materials with the carbohydrate-based polymeric material.

Such blending has surprisingly been observed by Applicant to result in an overall blend that is home compostable, even though the PLA itself (whether alone or blended with PBAT) normally does not meet such standards. This is believed to be at least partially due to the homogenous blending of NuPlastiQ material into the polyester components. In any case, the blend of such materials meets the applicable home compostability standard tests, as evidenced by third party testing included in the Examples section of the present application.

Such blends may be formed in manufacture into a desired article through any conceivable process. An example of such would be an extrusion process. For example, the polyester plastic materials (e.g., PBAT and PLA) and the carbohydrate-based polymeric material can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier on along the screw than the other), etc. It will be apparent that many numerous configurations are possible.

The two polyester materials (e.g., PBAT and PLA), may be sourced from petrochemical sources, or from so-called "green" or sustainable sources (e.g., corn used to produce lactic acid, used for forming PLA, or the like). Those or ordinary skill in the art will recognize that renewable or sustainable source materials refer to e.g., plant sources that are renewable within less than 100 years, rather than petrochemical feedstocks. Those of skill in the art will also appreciate that there are various tests for confirming sustainable or renewable content in plastics or other materials, e.g., as the ratio of $C^{14}$ to $C^{12}$ is elevated in renewable materials containing carbon, as compared to fossil fuel sourced materials.

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which can result in a synergistic increase in strength, e.g., as described in Applicant's U.S. Pat. No. 10,214,634, and U.S. application Ser. No. 16/287,884 filed Feb. 27, 2019, each of which is herein incorporated by reference in its entirety. A plasticizer is also present within the mixture of components from which the carbohydrate-based polymeric material is formed. Water may also be used in forming the carbohydrate-based polymeric material (e.g., initially present as a plasticizer), although only a small to negligible amount of water is present in the finished carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to the plasticizer (e.g., glycerin). The finished carbohydrate-based polymeric material as exemplified in NuPlastiQ is not merely a mixture of starch and glycerin, as will be described hereafter in conjunction with FIG. 3. That said, the NuPlastiQ material is derived from a mixture of these materials.

The percentages above may represent starch percentage relative to the starting materials from which the carbohydrate-based polymeric material is formed, or that fraction of the finished carbohydrate-based polymeric material that is derived from or attributable to the starch(es) (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1% (e.g., 0.1 to 1.5%)) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material). Such percentages may also represent that fraction of the mixture of materials from which the finished carbohydrate-based polymeric material is formed, excluding any initially present water. Of course, it may be possible that the carbohydrate-based polymeric material may be manufactured with less than 12% plasticizer (e.g., less than 12%, perhaps even 0%).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glycerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The NuPlastiQ materials available from BiologiQ are examples of such finished carbohydrate-based polymeric materials, although it will be appreciated that other materials available elsewhere (e.g., at some future time) may also be suitable for use.

In some embodiments, mixtures of different starches may be used in forming the carbohydrate-based polymeric material. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BioLogiQ, located in Idaho Falls, Id., under the tradename NuPlastiQ. Specific examples include but are not limited to NuPlastiQ GP and NuPlastiQ CG. NuPlastiQ may be provided in pellet form. Physical characteristics for two examples of NuPlastiQ materials, previously referred to as GS-270 and GS-300, are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

As mentioned, the above basic characteristics shown for GS-270 and GS-300 are exemplary of newer NuPlastiQ products available from BioLogiQ, although values may vary somewhat. For example, suitable NuPlastiQ products may generally have a glass transition temperature ranging from about 70° C. to about 100° C. Those of skill in the art will appreciate that glass transition temperature can be indicative of degree of crystallinity. Values for melting temperature range, density, Young's Modulus, and water content are similar to those shown above in Table 1. Some characteristics may similarly vary somewhat (e.g., ±25%, or ±10%) from values shown in Table 1. NuPlastiQ has an amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline), as will be described in further detail in conjunction with FIG. 3 below.

While some of the properties may be similar to other thermoplastic starch materials, others may differ markedly from typical such starch-based materials. For example, the density of such reactively extruded NuPlastiQ materials is particularly high, e.g., greater than 1 g/cm$^3$, at least 1.1 g/cm$^3$, at least 1.2 g/cm$^3$, or at least 1.25 g/cm$^3$, (e.g., the 1.4 g/cm$^3$, as shown above in Table 1). Various of the other properties may also differ substantially from superficially similar appearing starch-based polymeric materials.

The NuPlastiQ materials have a low water content, as described. As this material absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during processing (e.g., extrusion, film blowing, injection molding, blow molding, etc.). As a result, films or other articles produced from a starch-based polymeric material blended with another plastic material may exhibit even lower water content, where the PBAT, PLA or other polyester materials employed may exhibit negligible water content, and any water in the NuPlastiQ may typically be released during manufacture of a desired article.

Low water content in the carbohydrate-based NuPlastiQ polymeric material, as well as hydrophobic, rather than hydrophilic characteristics in the NuPlastiQ, can be important, as significant water content (or hydrophilicity) can result in incompatibility with the polyester materials (which at least in the case of PBAT and PLA are typically considered hydrophobic) with which the NuPlastiQ material is blended. Water content is particularly a problem where the article requires formation of a thin film. For example, as the water vaporizes, this can result in voids within the film or other article, as well as other problems. When blowing a thin film, the carbohydrate-based polymeric material used may preferably include no more than about 1% water. By matching hydrophobicity between the NuPlastiQ material and the polyester polymeric materials blended therewith, this can also aid in achieving the a homogenous distribution of very small particle sizes for the NuPlastiQ material dispersed within the polyester materials, as described in Applicant's Patent Application No. 62/872,582 filed Jul. 10, 2019, herein incorporated by reference in its entirety.

Figure 3:
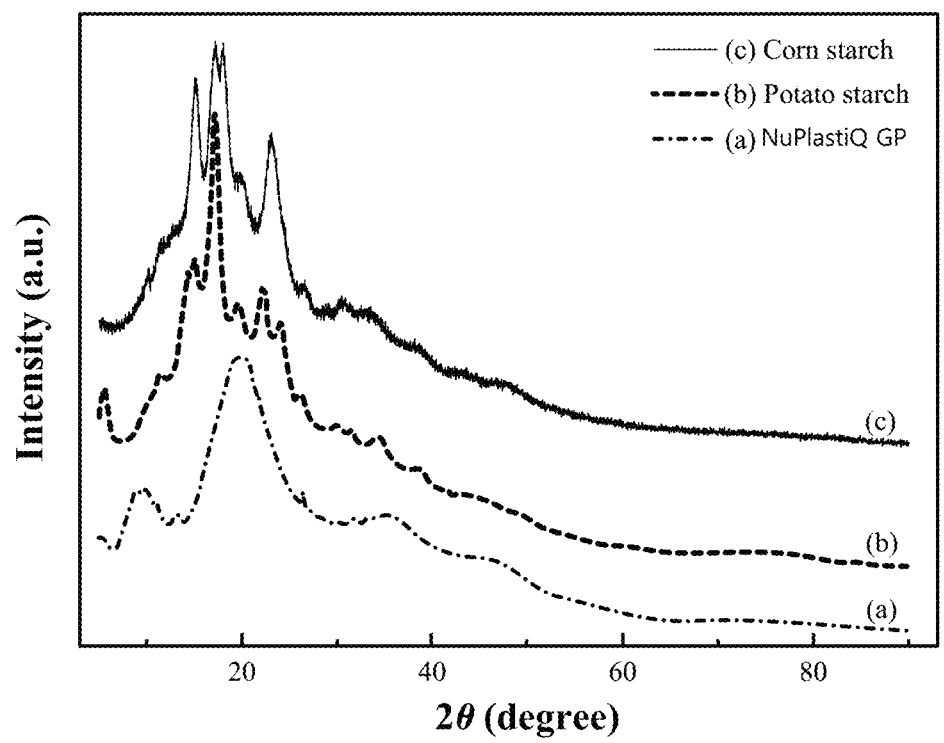
FIG. 3 shows X-ray diffraction (XRD) patterns for NuPlastiQ GP, a carbohydrate-based polymeric material commercially available from BioLogiQ as compared to XRD patterns for native corn starch and native potato starch, which are used to form the NuPlastiQ GP. Significantly reduced crystallinity is readily apparent.

Low water content is not achieved in the NuPlastiQ material through esterification, as is common in some conventional TPS materials that may include relatively low water content. Such esterification can be expensive and complex to perform. Furthermore, the NuPlastiQ materials that are exemplary of the carbohydrate-based polymeric materials employable herein have been mechanically, physically or chemically reacted and/or altered, compared to the starting starch and glycerin materials. The finished carbohydrate-based polymeric material may be substantially devoid of starch in such identifiable, native form. X-ray diffraction patterns of exemplary carbohydrate-based polymeric materials as described below (e.g., as shown in FIG. 3) evidence such chemical or physical alteration. In addition, both the starch and glycerin starting materials are hydrophilic, while the NuPlastiQ material is hydrophobic. In other words, the carbohydrate-based polymeric material is not recognized as a simple mixture including native starch and glycerin. The low water content achievable in the carbohydrate-based polymeric material, as well as the exhibited hydrophobicity may be due at least in part to the physical or chemical alteration of the starch and plasticizer materials into a hydrophobic thermoplastic polymer, which does not retain water as would native starch, or conventional thermoplastic starches.

Nevertheless, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C.

for 1-4 hours, which is sufficient to drive off any absorbed water. Pellets should be dried to less than about 1% moisture content prior to processing, particularly if forming a film. NuPlastiQ pellets may simply be stored in a sealed container with or without a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical plastic resin pellets) in standard plastic production processes. NuPlastiQ materials and products made therefrom may exhibit gas barrier characteristics. Products (e.g., films) made using such pellets exhibit oxygen gas barrier characteristics. NuPlastiQ materials may be non-toxic and edible, made using raw materials that are all edible. NuPlastiQ and products made therefrom may be water resistant, even hydrophobic, but also water soluble. For example, NuPlastiQ may resist swelling under moist heated conditions to the point that pellets (e.g. with a size of 3-4 mm) thereof may not completely dissolve in boiling water within 5 minutes, but a pellet will dissolve in the mouth within about 10 minutes. That said, films comprising NuPlastiQ may still have surface wettability that is relatively low (e.g., 40 dynes/cm or less), similar to the PBAT, PLA or other polyester materials with which it is being blended, which is lower than for conventional blends of TPS materials.

The NuPlastiQ material also does not typically undergo disintegration or biodegradation under typical storage conditions, even in relatively humid conditions, as the other conditions typical of a landfill, compost or similar disposal environment are not present. Of course, where such conditions are present, not only does the NuPlastiQ biodegrade, but the PLA also exhibits enhanced biodegradability, so as to meet home compostability standards.

NuPlastiQ can be cost competitive, being manufactured at a cost that is competitive with traditional polyethylene or other inexpensive plastic resins. This is advantageous, as polyester resins such as PBAT and PLA are significantly more expensive than polyethylene. This allows the present blends to be comparatively less expensive than would otherwise be the case, because of their inclusion of NuPlastiQ. More specifically, PBAT may typically be about 3× as expensive as polyethylene. Because NuPlastiQ is competitive in cost with polyethylene, the present blends can actually be provided less expensively than a conventional 100% PBAT film (or blend of PBAT/PLA) or other article. In addition to potentially improved cost structure, the present blends also offer the advantage of a significant fraction of the blended article being sourced from a sustainable source material (e.g., starch) which is often otherwise considered waste.

By way of further explanation, PLA is industrially compostable, meaning that it can degrade under elevated temperature conditions (i.e., industrial composting conditions, i.e., 58° C.), but is technically not "biodegradable" under less favorable conditions (e.g., at 28° C.). PBAT is certified as home compostable under such less favorable conditions. While some polyesters (e.g., PBAT) may be compostable, even at relatively lower temperature conditions (e.g., 28° C.), others of such materials do not meet such standards. The degree to which a given polyester plastic material will biodegrade or is compostable varies from one material to another. For example, PHA and PBAT may be two of the more easily biodegraded polyester polymeric materials. PLA and PCL and various other polyesters may exhibit less biodegradability under given conditions (e.g., less favorable conditions, such as at 28° C.). By homogenously blending the carbohydrate-based polymeric materials having particular characteristics (e.g., as exemplified in NuPlastiQ) therewith, the extent and/or rate of biodegradability (particularly under lower temperature home composting conditions) is significantly increased for PLA and likely other similar polyester materials with which it is blended. Current FTC Green guidelines stipulate that a plastic cannot make an unqualified claim that it is "degradable" unless it will degrade within a "reasonably short period of time" (most recently defined as within 5 years) "after customary disposal". The present blends provide the ability to meet applicable guidelines, allowing a "pass" certification for home compostability (e.g., NF T51-800 (2015); AS 5810 (2010); or the OK Compost Home Certification scheme of TÜV Austria Belgium) for the present blends.

In some embodiments, the NuPlastiQ could be provided in a masterbatch formulation that may include the carbohydrate-based polymeric material, one or more of the polyester plastic materials, and optionally a compatibilizer. Such a masterbatch may include an elevated concentration of the carbohydrate-based polymeric material, e.g., so as to be specifically configured for mixing with pellets of the polyester material(s) at the time of further processing where a given article is to be formed, effectively dropping the concentration of the carbohydrate-based polymeric material down to the desired final value (e.g., the masterbatch may be at about 50-80% NuPlastiQ, while the finished article may include 30-55% NuPlastiQ). Any conceivable ratios may be used in mixing such different pellets, depending on the desired percentage of NuPlastiQ and/or compatibilizer and/or polyester plastic material in the finished article.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BioLogiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BioLogiQ does not revert back to a mostly crystalline structure as it remains substantially amorphous indefinitely.

In contrast to typical TPS materials, the NuPlastiQ materials that are suitable examples of starch-based polymeric materials for use in forming articles described in the present application have an amorphous microstructure, and physical characteristics. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 3 comparing diffraction pattern results for NuPlastiQ GP as compared to native raw corn starch and native raw potato starch from which the NuPlastiQ GP of FIG. 3 is formed. The diffraction pattern of the NuPlastiQ as seen in FIG. 3 is much less crystalline (e.g., crystallinity of about 7%) than that of the native corn and potato starches (crystallinity of about 42% and 31%, respectively). The difference in diffraction pattern evidences that a substantial chemical change has occurred in the material, due to conversion from the native starches into NuPlastiQ (e.g., through a reactive extrusion process). For example, while there are several prominent diffraction peaks between about 15-25° with the native starch, the diffraction is quite different with the NuPlastiQ material, which shows a far less intense, "bell curve shaped" peak centered at about 20°. Interestingly, the NuPlastiQ shows a small peak at about 10°, while the starch materials actually show a trough at 10°, although the small peak at 10° for the NuPlastiQ is still at a lower intensity than the troughs of the native starch materials. Across the entire spectrum, the diffraction intensities are higher for the native starches than for the NuPlastiQ. The elevated diffraction intensity seen across a wide spectrum is indicative of greater crystallinity of the native starches as compared to the NuPlastiQ. Numerous differences exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than 9%, less than about 8%, less than 7%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the chemical or microstructure of the finished NuPlastiQ as compared to the starting materials, bags, other films, bottles, sheets, disposable utensils, plates, cups, or other articles produced from a blend including the carbohydrate-based polymeric material are different from articles that are otherwise similar, but formed using conventional TPS or starch powder, or the polyester plastic materials alone. For example, articles formed by blending the carbohydrate-based polymeric materials such as NuPlastiQ as described herein with a polyester plastic material do not have such large "sea-island" particle size features that are common when blending conventional TPS materials with other polymeric materials. Rather, a substantially homogenous blend is achievable when using Applicant's NuPlastiQ material in the blend. The homogeneous blend characteristics may play a part in the observed accelerated or enhanced home compostability. Further details of the homogenous blending characteristics, including characterization of the resulting small size starch particles is found in Applicant's Patent Application No. 62/872,582 filed Jul. 10, 2019, already incorporated by reference in its entirety.

As described herein, blending of the carbohydrate-based polymeric materials as described herein with a blend of PBAT and PLA results in not just the carbohydrate-based material and PBAT materials biodegrading under home compost conditions, but the PLA also exhibits biodegradability under such home compost conditions, so that the blend as a whole can be certified under any such applicable standard (e.g., NF T51-800 (2015); AS 5810 (2010); or the OK Compost Home Certification scheme of TÜV Austria Belgium). Such results do not necessarily occur when blending with typical TPS materials but do occur in the present blends. Such different results clearly illustrate that there are significant structural and/or chemical differences in the NuPlastiQ material as compared to conventional TPS materials, and in blends that include NuPlastiQ, as the entire composite structure of the blend (i.e., the film or other structure) is now capable of being substantially fully biodegraded in home compost conditions, as shown by the various examples below.

Without being bound to any particular theory, it is believed that the carbohydrate-based polymeric resins may reduce the crystallinity of the blended products, interrupting the crystallinity and/or hygoscopic barrier characteristics of the PLA polyester plastic material in a way that allows water and bacteria to degrade the arrangements and linkages of otherwise stable plastic molecules of the PLA in the blend along with the carbohydrate-based polymeric resin material. In other words, the ester linked PLA monomers or other components of the polymers may be more easily broken away and eventually digested by microbes that exist in such environments, when homogeneously blended with the particular carbohydrate-based polymeric materials as contemplated herein. The microorganisms that exist naturally in a home compost environment can consume such small molecules so that they are converted back into natural components (such as $CO_2$, $CH_4$, and $H_2O$). Of course, the PBAT in the blend is already capable of achieving such on its own, without the addition of the carbohydrate-based polymeric material, although the rate and/or extent of biodegradation achieved in such conditions, when intimately blended with the carbohydrate-based polymeric material may be enhanced (e.g., faster rate and/or further extent)

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the remaining molecules by microbial assimilation.

Plastics made from petrochemical feedstocks or derived from plant sources begin life as monomers (e.g., single small molecules that can react chemically with other small molecules). When monomers are joined together, they become polymers ("many parts"), known as plastics. Before being joined together, many monomers are readily biodegradable, although after being linked together through polymerization, the molecules become so large and joined in such arrangements and linkages that microbial assimilation by microorganisms is not practical within any reasonable time frame under the contemplated conditions.

Polymers are formed with both crystalline (regularly packed) structures and amorphous (randomly arranged) structures. Many polymers contain a high degree of crystallinity with some amorphous regions randomly arranged and entangled throughout the polymeric structure.

NuPlastiQ materials available from BiologiQ are formed from starting starch materials which are highly crystalline, but in which the finished NuPlastiQ plastic resin material exhibits low crystallinity (i.e., they are substantially amorphous). Such starch-based polymer materials are used as a starting material in the production of articles as described herein. NuPlastiQ is, therefore, plastic that is made from starch. Because of its natural, starch-based origin and carefully controlled linkage types, the molecules (size and links) of plastic made with NuPlastiQ are highly susceptible to biodegradation by enzymatic reactions caused from the introduction of water and bacteria or other microorganisms, as evidenced by the experimental test results included herein.

Like polyolefins such as polyethylene and polypropylene, polyesters typically have a high degree of crystallinity and are made by converting monomer molecules (whether petroleum derived or derived from lactic acid or other small building block molecules derived from plant sources) into long chain polymers. In polyesters, the linkages between monomers are of course ester linkages. The linkages created when connecting the monomers to form long polymer chains can be relatively strong and difficult to break, with differences in difficulty existing between different types of polyesters. For example, the linkages in PBAT (and PHA) are more easily broken than in the case of PLA. While many synthetic polyesters (including both PBAT and PLA) exhibit significant biodegradability under elevated temperature compost conditions (e.g., at 58° C.), and PBAT also exhibits sufficient biodegradability to meet the standards of home compostability (e.g., at 28°), PLA is not able to meet the home compostability standard on its own, or even when blended with PBAT. Blending such materials with Applicant's NuPlastiQ material changes that.

In addition to enhanced home compostability, in some embodiments, the resulting polyester blends of this invention may have a higher elastic modulus (stiffness, or strength) than one or both of the polyester plastic materials alone, and can be used to make plastic films or other articles that are at least as strong or stronger than the same articles made with a given one of the pure polyester plastic materials alone. For example, PBAT alone exhibits relatively low stiffness, but excellent elongation. PLA has a significantly higher elastic modulus, and blending the NuPlastiQ and PLA into the PBAT increases the elastic modulus of the resulting blend, as compared to the PBAT alone. In other embodiments, depending on the characteristics of the polyester material being blended with, strength characteristics may be decreased, but still sufficient for the desired purpose. By way of example, such a blend may provide a dart drop strength of at least 130 g, at least 140 g, at least 150 g, at least 160 g, at least 175 g, at least 200 g, at least 225 g, at least 250 g, at least 275 g, or at least 300 g, at a thickness of 1 mil. With increased thickness, there is generally an increase in strength. The fraction of carbohydrate-based polymeric material in the blend may be as described herein or as described in others of Applicant's applications, e.g., from 1% to 70%, from 10% to 65%, from 20% to 55%, from 30% to 55%, etc. FIG. 3A charts strength data for various thickness films, as compared to various other materials (e.g., 100% PBAT, 100% LLDPE, and a 25% blend of NuPlastiQ with LLDPE). The sample labeled BC27241 in FIG. 3A included 35% NuPlastiQ, 11% PLA, and 54% PBAT. The sample labeled BC27251 in FIG. 3A included 41% NuPlastiQ, 11% PLA, and 48% PBAT.

Figure 4:
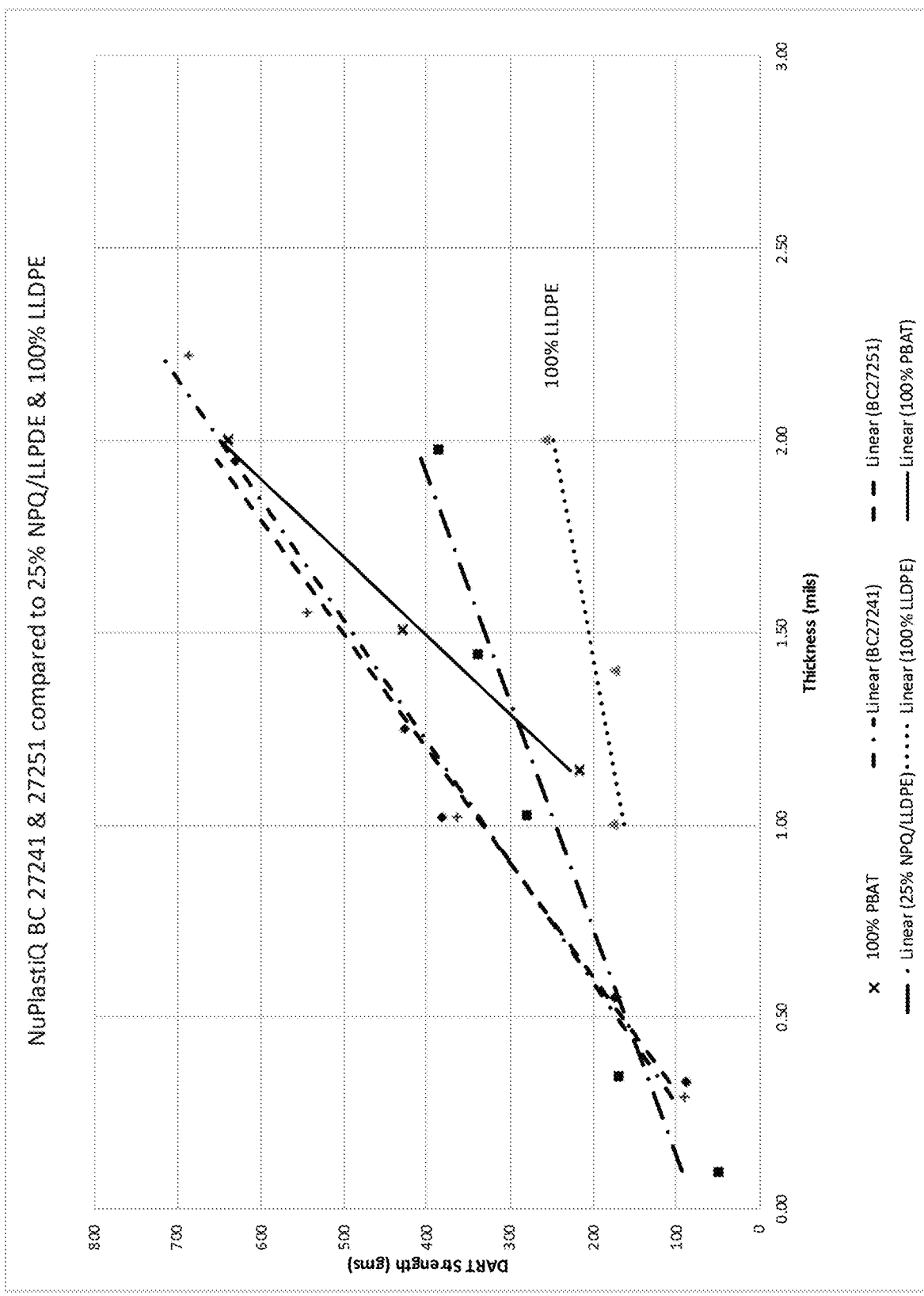
FIG. 4 shows dart drop impact strength data for exemplary blends of PBAT and PLA with NuPlastiQ.

FIG. 4 illustrates molecular weight data for an exemplary NuPlastiQ (e.g., the same NuPlastiQ GP as in FIG. 3) material. As shown, the average molecular weight (i.e., weight average molecular weight) may be about 900,000 g/mol. For example, weight average molecular weight may be greater than 200,000 g/mol, greater than 300,000 g/mol, greater than 400,000 g/mol, greater than 500,000 g/mol, greater than 600,000 g/mol, greater than 700,000 g/mol, from 500,000 to 5 million g/mol, from 500,000 to 3 million g/mol, from 500,000 to 2 million g/mol, from 500,000 to 1 million g/mol or from 800,000 to 1 million g/mol.

Figure 5:
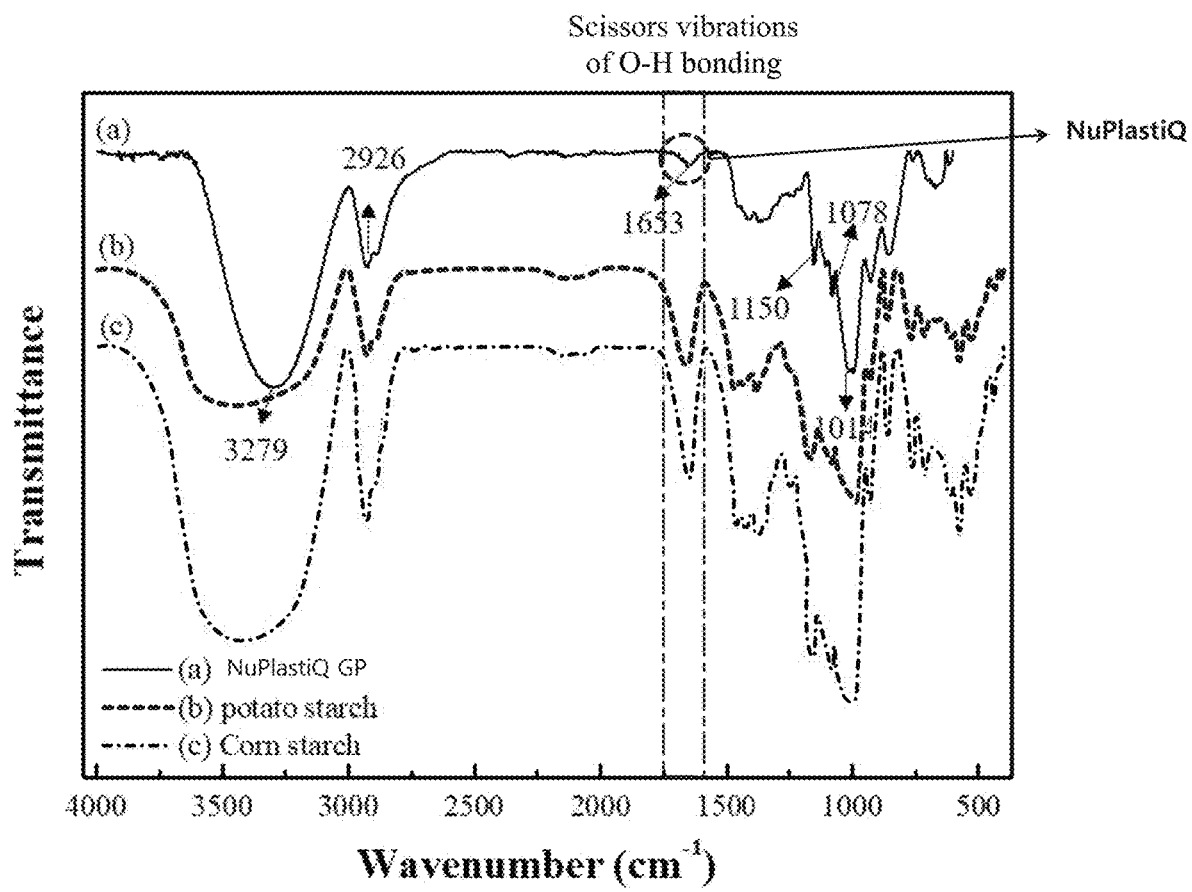
FIG. 5 shows FT-IR spectrum data for NuPlastiQ GP, as well as for native corn starch and native potato starch. While the starches are hydrophilic, the NuPlastiQ GP is hydrophobic.

FIG. 5 shows transmittance data for the same materials compared in the X-ray diffraction chart of FIG. 3. It is readily apparent that the O—H scissors vibrations peak at 1653 $cm^{-1}$ of the NuPlastiQ material is significantly reduced, by comparison to the native corn and potato starch materials. This decreased incidence of such OH groups is consistent with the low wettability shown in FIG. 6.

Figure 6:
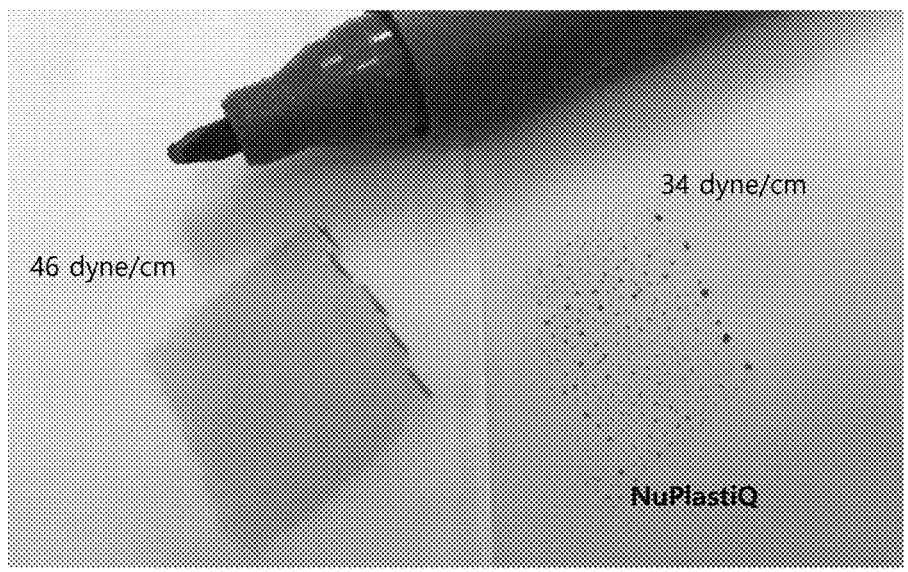
FIG. 6 is a photograph showing the relative hydrophobicity characteristics of a film comprising NuPlastiQ blended with another polymeric material compared to another film comprising a conventional starch blended with another polymeric material, showing how the NuPlastiQ is far more hydrophobic, at given weight fractions of the starch-based component, for the same polyolefin matrix material, as tested with a Dyne pen.

FIG. 6 shows a comparison of the wettability characteristics of a conventional blend of a polyolefin with a conventional TPS material (left), which has a wettability of greater than 46 dyne/cm, as compared to an exemplary blend of a polyolefin with NuPlastiQ GP (right), which has a wettability of less than 34 dyne/cm. In both examples, the starch-based polymeric content is believed to be 20-25%. Although the illustration is with polyolefin (rather than polyester) blends, the comparison illustrates the hydrophobicity of the NuPlastiQ GP material as compared to the hydrophilic nature of conventional starch materials. The PBAT and PLA materials used in the blends as described herein typically exhibit hydrophobic characteristics, similar to those of polyolefins. For example, such materials often have wettability values when used in a dyne test of less than 40 dyne/cm, less than 38 dyne/cm, less than 36 dyne/cm, less than 34 dyne/cm, or from 30-40 dyne/cm. The NuPlastiQ material exhibits wettability characteristics that are similarly matched to the hydrophobic polyesters, e.g., less than 40 dyne/cm, less than 38 dyne/cm, less than 36 dyne/cm, or less than 34 dyne/cm. Surface wettability dyne tests may be according to DIN 53394/ISO 8296, for example. Such matched hydrophobicity between the NuPlastiQ material and the polyester material with which it is blended may play a part in the ability to achieve the biodegradability characteristics described herein.

Figure 7:
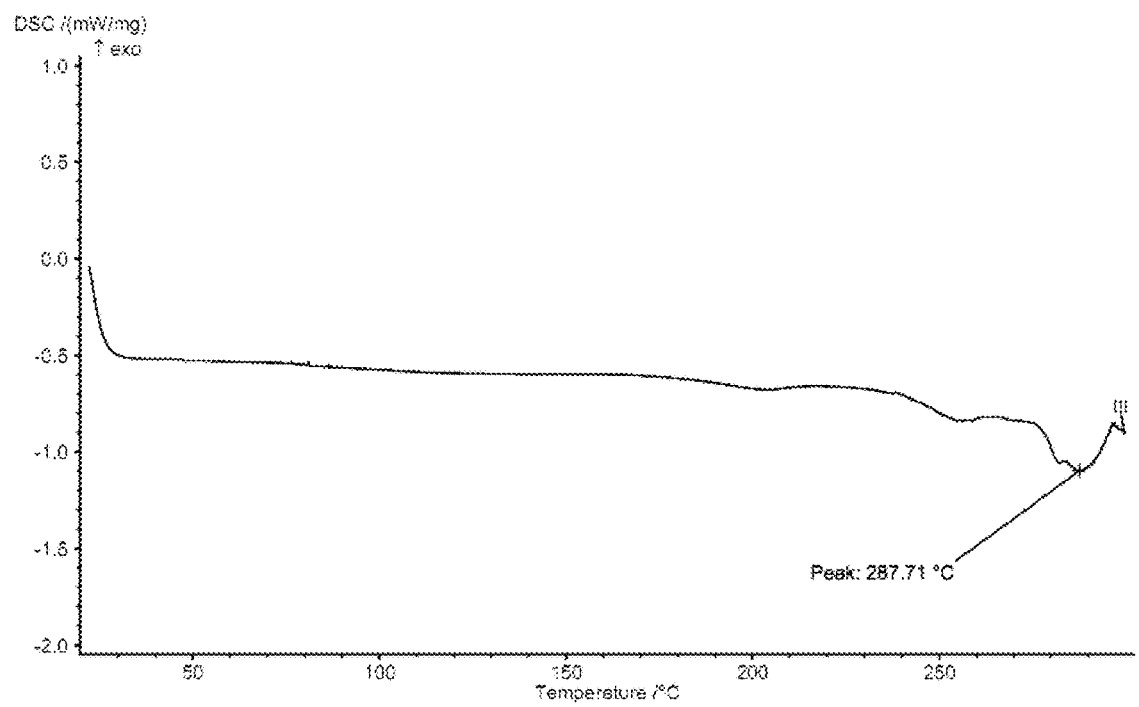
FIG. 7 shows DSC melting temperature profile data for a conventional starch material.

FIG. 7 illustrates comparative DSC melting temperature data on a conventional starch material, which shows a melting temperature of 287.7° C., which is far higher than the melting temperature of about 170° C. for NuPlastiQ.

Figure 8:
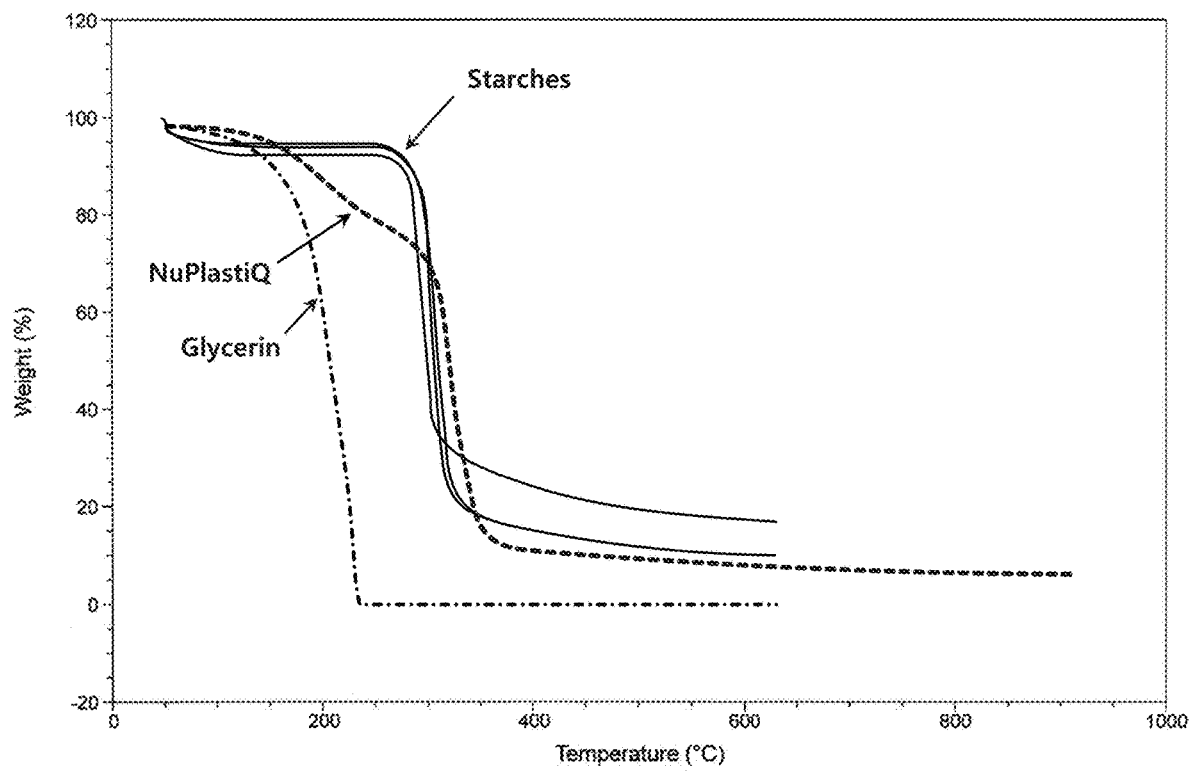
FIG. 8 shows TGA temperature stability data for an exemplary NuPlastiQ material, as compared to glycerin and starches.

FIG. 8 shows TGA temperature stability characteristics for the NuPlastiQ GP material, as compared to the starting glycerin and native starch materials.

Returning to FIG. 1, at 106, the process 100 includes mixing the polyester plastic materials and the carbohydrate-based polymeric material to produce a mixture of materials. In some cases, the mixing of the polyester plastic materials and the carbohydrate-based material can be performed using one or more mixing devices. In a particular implementation, a mechanical mixing device can be used to mix the polyester plastic materials and the carbohydrate-based polymeric material. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The carbohydrate-based polymeric material can be present in the mixture in an amount at least sufficient to increase biodegradability of the PLA polyester plastic material of the blend, so that the blend passes any of the various applicable home compostability standards. Higher amounts than such a threshold amount may of course be included (e.g., to further enhance biodegradability, and or increase renewable content of the blend, etc. By way of example, the carbohydrate-based polymeric material may be included in an amount of at least at least 1%, at least 5%, at least 10%, no greater than 70%, no greater than 60%, from 1% to 70%, from 10% to 65%, from 20% to 55%, or from 30% to 55% by weight of the mixture of materials. More than one carbohydrate-based polymeric material, and/or more than two polyester plastic materials may be included in the blend, if desired.

The first polyester plastic material (e.g., PBAT) can be present in the mixture of materials in an amount of at least 20%, at least 25%, at least 30%, at least 35%, from 20% to 85%, from 30% to 70%, or from 30% to 60% by weight of the mixture of materials. The second polyester plastic material (e.g., PLA) can be present in the mixture of materials in an amount of at least 1%, at least 3%, at least 5%, at least 6%, at least 7%, at least 8%, at least 9%, or at least 10%, at least 11%, no more than 50%, no more than 40%, no more than 30%, no more than 20%, no more than 15%, from 1% to 20%, from 1% to 15%, from 1% to 12%, from 3% to 15%, from 5% to 15%, or about 10% to 15% by weight of the mixture of materials.

Applicable home compostability standards accept any test result where greater than 90% biodegradation occurs, although the standard(s) also require any component included in the blend at less than or equal to 10% of the blend to pass on its own, to ensure that this material that may be included in a minor amount, is in fact passing the applicable standard(s).

A compatibilizer may optionally be present in the mixture of materials, although such is generally not necessary. In an embodiment, no such compatibilizer may be included. Where present, the compatibilizer can be mixed with the polyester plastic material(s), the carbohydrate-based polymeric material, mixed with both, or provided separately. Often the compatibilizer may be provided with at least one of the polymeric materials, e.g., included in a masterbatch formulation. The compatibilizer can be a modified polyester, such as a maleic anhydride grafted polyester (e.g., maleic anhydride grafted PBAT or PLA), etc. The compatibilizer can also include an acrylate based co-polymer. Additionally, the compatibilizer can include a poly(vinylacetate) based compatibilizer. In an embodiment, the compatibilizer may be a grafted version of the polyester plastic material (e.g., maleic anhydride grafted polyester) or a copolymer (e.g., a block copolymer) where one of the blocks is of the same monomer as the polyester plastic material (e.g., a polyester copolymer). In at least some embodiments, no compatibilizer is present, as none may be needed.

Where included, the mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, no greater than 5%, no greater than 4%, no greater than 3%, from 0.5% by weight to 12%, from 1% to 7%, or from 1% to 6% by weight of a compatibilizer. Due to cost, generally the lowest effective amount of compatibilizer (or no compatibilizer) may be used.

Although certainly not required, and in at least some embodiments the inclusion of such would be best avoided, it is within the scope of the present invention to include any of a variety of UV and/or OXO degradable additives. Additional details of such additives are found in Applicant's U.S. patent application Ser. No. 16/391,909, herein incorporated by reference in its entirety. Other additives, for example, for increased strength (e.g., Biomax® Strong from Dupont), or otherwise may be included.

One or more additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture.

While principally described in the context of a mixture of thermoplastic materials that can be melted together, to form a desired blend, in some embodiments, it may be possible to blend the carbohydrate-based polymeric material with a plastic material that is not thermoplastic (e.g., a thermoset polyester or other thermoset plastic material that may be included in the blend). For example, the resin components that are precursors of such a non-thermoplastic polyester plastic material may be blended with the carbohydrate-based polymeric material, where polymerization or other formation of the polyester material may occur in the presence of the carbohydrate-based polymeric material, resulting in a finished article that is a blend of the carbohydrate-based polymeric material and a thermoset or other non-thermoplastic plastic material, where the carbohydrate-based polymeric material may increase biodegradability of a given polymeric component included in the blend.

Referring again to FIG. 1, at 108, particularly where the materials are thermoplastic, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C. Of course, it will be appreciated that in some embodiments, the mixture may be heated to temperatures greater than 200° C.

Heating of such materials may be within a multi-stage extruder, which heats the mixture of materials to a given temperature in each extruder stage, where progressive stages are heated to higher temperature than the preceding stage, e.g., as disclosed in various of Applicant's patent applications, already incorporated by reference. In an embodiment, the temperature of the first stage of such extruder for the blend may be in the same range as the temperature of the carbohydrate-based polymeric material (e.g., NuPlastiQ) in the final stage of the reactive extrusion process in which it was manufactured (e.g., 120-140° C.), as described in Applicant's U.S. Application Nos. 62/872,582 and 62/939,460 filed Jul. 10, 2019 and Nov. 22, 2019 respectively, each of which is herein incorporated by reference in its entirety. As described in those applications, Applicant has found that controlling the conditions at which the starch and other ingredients (such as the plasticizer) are maintained during the preparation of NuPlastiQ contribute to the desired formation of a starch-based polymeric material with small particle size and tight distribution in the final blend of the starch-based polymeric material once blended with the other polymer(s). Thus, the materials during reactive extrusion formation of the starch-based polymeric material are maintained at a temperature of 110° C. to 160° C. and preferably 120° C. to 140° C. (e.g., about 130° C.) in the final stage of the extruder, prior to its mixing with the other polymer such as a polyester, polyolefin, etc. It will be apparent that this careful control of temperature in the last stage of the reactive extrusion step when forming the starch-based polymeric material is different from control of temperature in an extruder when blending such already formed starch-based polymeric material with the other polymer with which it is being blended. Although such temperatures may be similar, the components present in such stages are entirely different (e.g., in the stage described here, no "other polymer", such as the polyesters, are typically present).

The mixture of materials including the polyester plastic materials and the carbohydrate-based polymeric material can be heated in one or more chambers of an extruder. In some cases, one or more chambers of the extruder can be heated at different temperatures. The speed of one or more screws of the extruder can be set to any desired rate.

It is of course also possible to heat one material first, then add a second and/or third material at a subsequent (e.g., downstream) input, and it will be heated after the earlier material, so that all materials can be melt-blended together. FIG. 1 is meant to encompass all such conditions.

At 110, an article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Cast films are also possible. Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided (e.g., 2 mm or more, such as 2-100 mm or 2 to 10 mm), produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Exemplary values for such characteristics are provided in various of Applicant's other applications, already incorporated by reference herein.

When subjected to biodegradation testing under relatively low temperature "home compost" type conditions (e.g., EN13432, which may otherwise be similar to the industrial compost testing under ASTM standard D-5338, but conducted at 28° C., rather than 58° C.). the present blends exhibit at least (or better than) 90% biodegradation within 365 days, which is sufficient to meet the biodegradability portion of applicable "home compostability" standards, such as NF T51-800 (2015); AS 5810 (2010); and the OK Compost Home Certification scheme of TÜV Austria Belgium. Such standards are herein incorporated in their entirety by reference. The 90% or higher biodegradation may be achieved more rapidly than the permitted 365 days, e.g., such as within 350 days, within 325 days, within 300 days, within 275 days, within 250 days, within 200 days, or within 180 days.

While biodegradation in a home composting environmental conditions is particularly contemplated, it will be appreciated that enhanced biodegradation may also be exhibited under other disposal environments, e.g., such as an anaerobic digester environment (e.g., as simulated by ASTM D-5511 or D-5526), or marine conditions (e.g., as simulated by ASTM D-6691).

When subjected to biodegradation testing, an article having no greater than about 2% by weight of a biodegradation enhancing additive (or preferably being free thereof) and having an amount of carbohydrate-based polymeric material and polyester plastic materials as described herein can exhibit enhanced home compostability, as a result of the introduction of the carbohydrate-based polymeric material into the article. For example, at least 90%, or even at least 95% of the polyester polymeric materials or the blend (e.g., or carbon atoms thereof) may biodegrade over a period of 365 days, 300 days, 200 days, or even 180 days. In any case, the degree of degradation of the PLA material of the blend, as well as the blend as a whole, will be greater than the degree of degradation exhibited by the material without addition of the NuPlastiQ or other carbohydrate-based polymeric material. Such enhanced biodegradation is particularly advantageous, as it allows formation of bags (e.g., carry out bags) or other films, which can include PLA in the polyester blend, while still meeting applicable home compostability standards.

Figure 2:
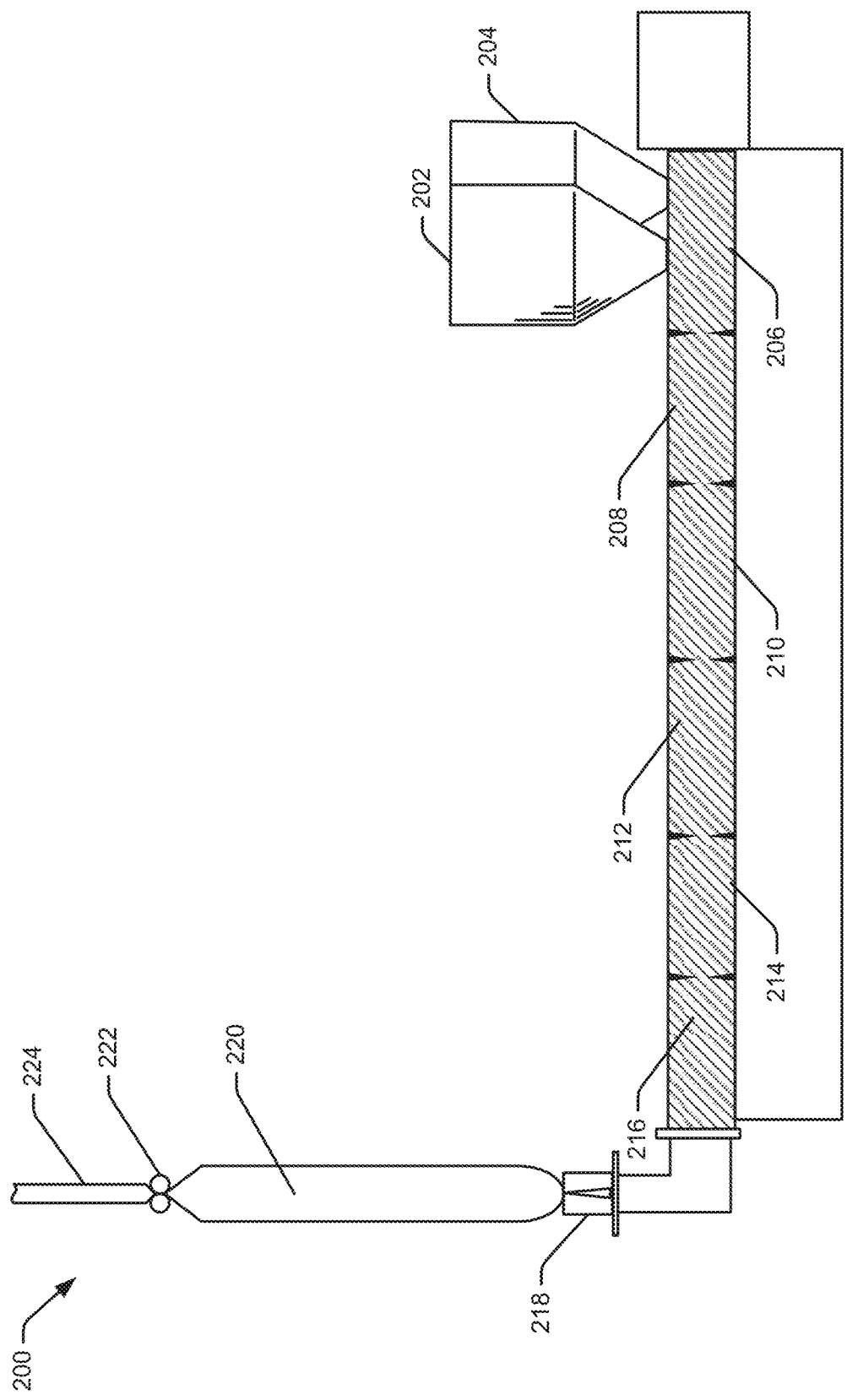
FIG. 2 illustrates components of an exemplary manufacturing system to produce articles according to FIG. 1.

FIG. 2 illustrates components of an example manufacturing system 200 to produce articles according to the present disclosure. In some cases, the manufacturing system 200 can be used in the process 100 of FIG. 1. In an illustrative example, the manufacturing system 200 is an extruder, such as a single screw extruder or a twin screw extruder.

In an implementation, two or more polyester plastic materials (e.g., PBAT and PLA) and one or more carbohydrate-based polymeric materials are provided via a first hopper 202 and a second hopper 204. More than two hoppers could be provided. A compatibilizer may optionally be included with either or both materials (e.g., in a masterbatch thereof). In an embodiment, no compatibilizer, or a minimal amount thereof (e.g., less than 5%, less than 4%, less than 3%, less than 2%, less than 1%, or less than 0.5%) is included. A calcium carbonate or other filler material (e.g., whether an inorganic filler such as calcium carbonate or talc, or a suitable organic filler) may be added separately or included in a masterbatch. In a typical implementation, compounding of the carbohydrate-based polymeric material into a masterbatch (e.g., with any optional compatibilizer) may have been performed previous to placing pellets of such masterbatch into hopper 204. Such a masterbatch may of course also include some portion of the polyester plastic material(s) therein, as well.

The one or more carbohydrate-based polymeric materials and the PBAT, PLA or other polyester plastic materials can be mixed in a first chamber 206 to produce a mixture of materials. In some cases, the mixture of materials can include from 5% by weight to 60% by weight of the one or more carbohydrate-based polymeric materials, and from 40% by weight to 95% by weight of the PBAT, PLA or other polyester plastic materials. Where an inorganic or other filler material is included (e.g., calcium carbonate and/or talc), such may be present from 0% to 30%, or up to 20% by weight. Percentages of the polymeric materials may be relative to the blend as a whole (e.g., including any filler and/or compatibilizer), or relative to just the polymeric materials. The ranges of course may be varied outside the above or other ranges herein, depending on desired characteristics.

One exemplary composition may include from 30% to 55% of the carbohydrate-based polymeric material(s), at least 10%, at least 15%, at least 20%, at least 25%, no more than 90%, no more than 85%, no more than 80%, from 10% to 80% from 20% to 70%, or from 30% to 60% of PBAT, up to 60%, up to 50%, up to 40%, up to 30%, up to 20%, or up to 15% PLA (e.g., 1% to 15%, or 1% to 12% PLA), and from 0% to 30% (e.g., 0%, 5%, 10%, 15%, 20%, 25%, 30%) calcium carbonate or other filler. A compatibilizer may or may not be present. All else being equal, higher fractions of PLA may biodegrade more slowly, but may still meet the 90% threshold of the standard, within 365 days. For example, including a PLA loading of only up to 20%, or up to 15% may result in a blend that may meet the 90% threshold of the standard within 200 days, or even 180 days.

As shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as bags (e.g., carry-out bags), agricultural mulch (weed barrier), other films, utensils, plates, cups bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.004 mm). Of course, thicknesses greater than 2 mil can also be achieved. In some cases, the film 224 can be comprised of a single layer. In other cases, the film 224 can be comprised of multiple layers. Where multiple layers are present, at least one of the layers may include the carbohydrate-based polymeric material. In some embodiments, the carbohydrate-based polymeric material may be present in one or more outer layers, in an inner layer, or in all layers.

The concepts described herein will be further described in the following examples. Some examples below show 90% or better biodegradation of the composite blends, and/or 90% or better of the polyester components (PBAT and/or PLA) thereof, within 365 days.

The biodegradation may be determined as is customary in respirometry-based tests, according to a mass balance on the carbon, whereby carbon atoms beginning in the material of the blend (e.g., in the carbohydrate-based polymeric material and/or in the polyesters) are accounted for in off-gassed products, as $CH_4$ and/or $CO_2$, as a result of biodegradation. For example, at least 90% of carbon atoms of any of the polyesters or the blend as a whole may become at least one of $CO_2$, or $CH_4$ within 365 days (or 300 days, or 200 days, or 180 days, etc.) in such simulated home composting conditions. To pass NF T51-800 (2015); AS 5810 (2010); or the OK Compost Home Certification scheme of TÜV Austria Belgium requires (1) certified heavy metals in solids "pass" rating for all components included in blend (e.g., the PBAT, PLA and the carbohydrate-based polymeric material included in the blend), e.g., according to ASTM D6400 or the like; (2) conversion of at least 90% of the carbon in the sample to $CO_2$, or $CH_4$ at 365 days according to EN13432; (3) disintegration "pass" under ISO 20200 or the like; and (4) exotoxicity "pass" rating for all components included in the blend, e.g., according to OECD Guideline 208, ASTM D6400 or the like. The samples shown in the examples below meet such requirements.

EXAMPLES

Example 1

Figure 9:
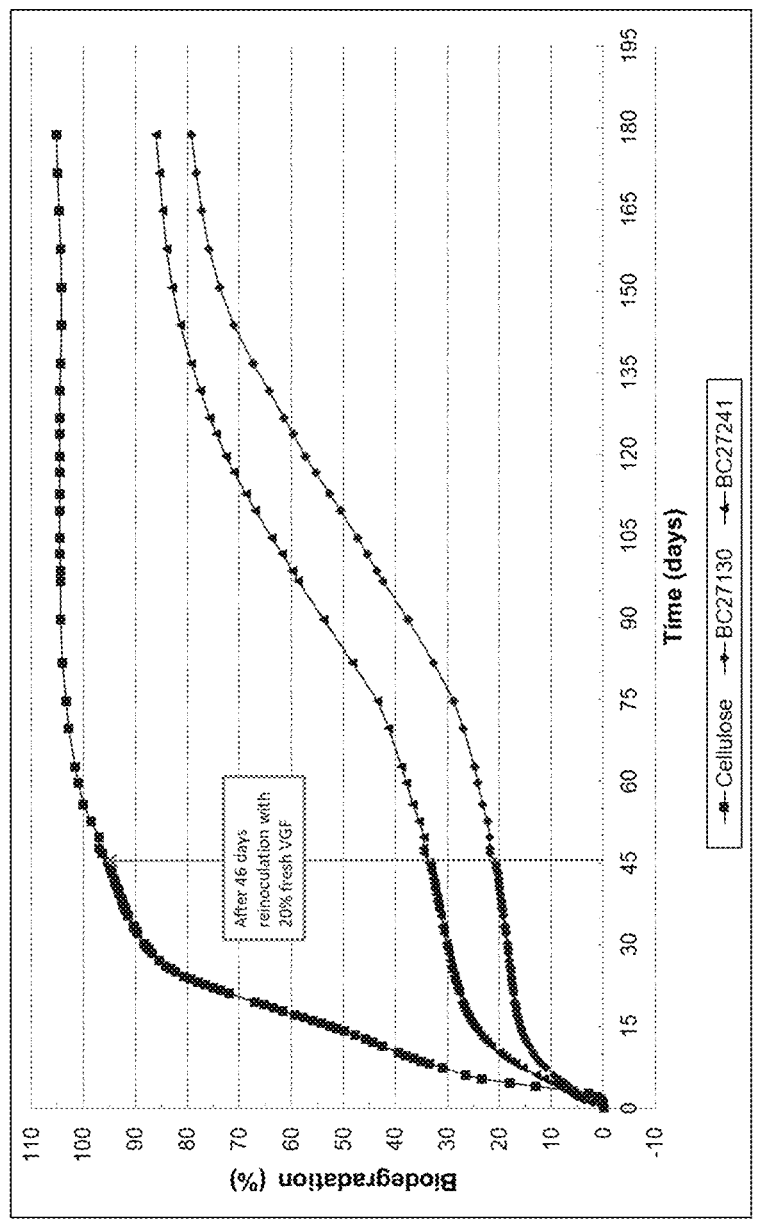
FIG. 9 shows percent biodegradation measured over 179 days according to EN13432 at Home Compost conditions, meant to simulate ambient temperature (28° C.) home compost conditions, for various samples made according to the present disclosure, as well as a positive comparative control, as described in Example 1.

Films made with a blend of NuPlastiQ, PBAT, and PLA were tested according to a standard controlled composting biodegradation test over 195 days according to ASTM D5338, and/or EN13432, at a temperature of 28±2° C., which is meant to simulate home compost conditions. The tested films are labeled BC27130 and BC27241 in Table 2 and FIG. 9. Table 2 and FIG. 9 show the results after 179 days into the 195 day test. After 179 days, samples BC27130 and BC27241 respectively showed adjusted (relative to the cellulose control) percent biodegraded values of 75.3% and 81.8%, respectively. In particular, sample BC27130 included 30% NuPlastiQ, and 70% PBAT. Sample BC27241 included 35% NuPlastiQ, 11% PLA, and 54% PBAT. No compatibilizer was present in either sample. Both films had a thickness of 1.5 to 2 mils.

The biodegradation percentage for the cellulose control that is over 100% can be explained by a synergistic effect, referred to as priming. In any case, the absolute biodegradation for test samples BC27130 and BC27241 was measured at 79.2% and 86%, respectively. The notation on FIG. 9 refers to a re-inoculation with 20% fresh vegetable, garden, and fruit waste (VGF) at day 46 in the test. The results in Table 2 and FIG. 9 show that the samples are on track to reach 90% or better biodegradation under home compost conditions within 365 days, and thus meet the home compostability standard.

TABLE 2

|  | Cellulose Control | BC27130 | BC27241 |
| --- | --- | --- | --- |
| Total Organic Carbon Content (TOC) % | 42.7 | 57.7 | 54.0 |
| Net $CO_2$ (mg/g of test sample) | 1646 | 1676 | 1702 |
| Biodegradation AVG (%) | 105.1 | 79.2 | 86.0 |
| Biodegradation SD (%) | 1.5 | 1.5 | 3.8 |
| Relative Biodegradation (%) | 100 | 75.3 | 81.8 |

Example 2

Figure 10A:
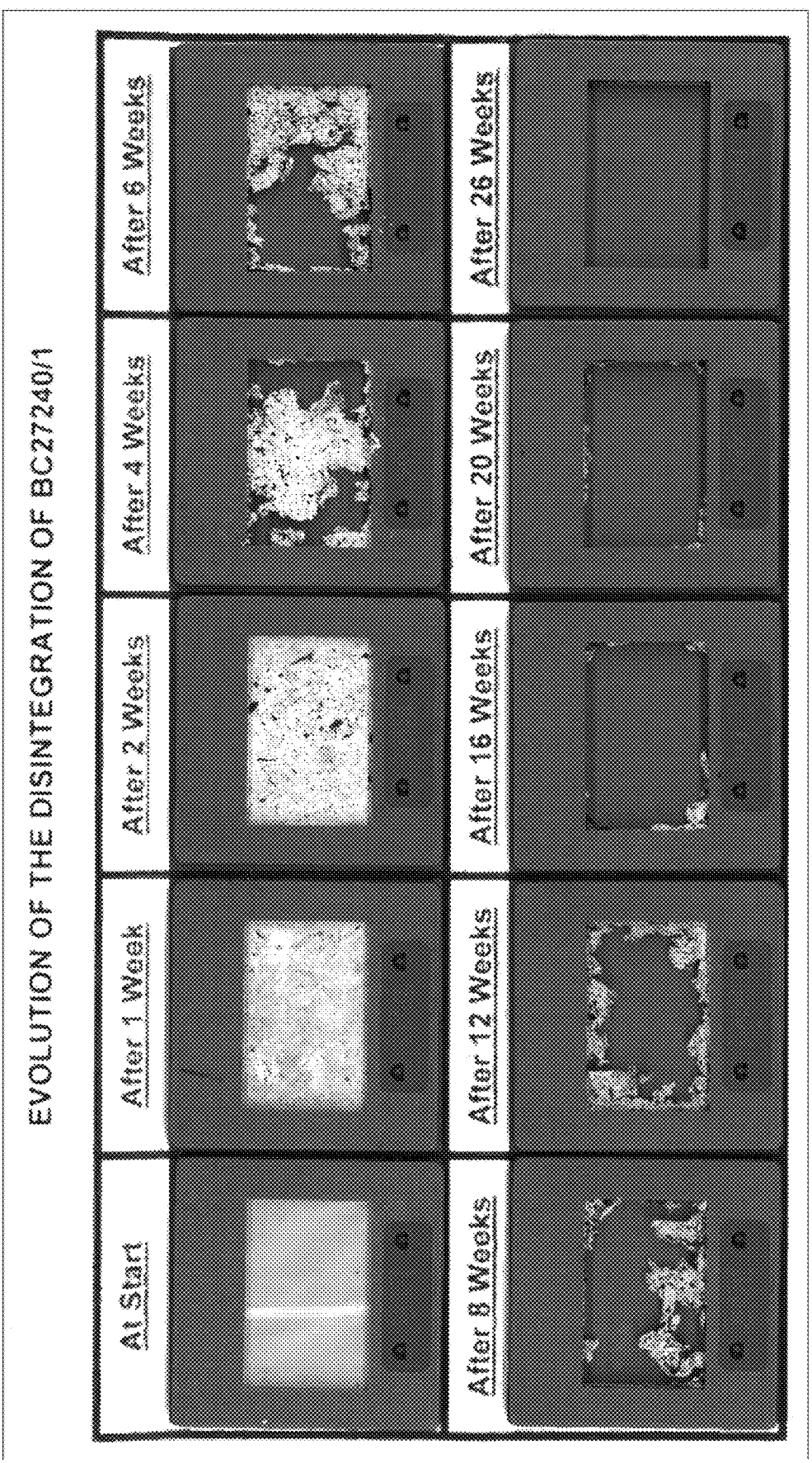
FIG. 10A shows results of a disintegration test from the start to 26 weeks based on ISO 20200 standards, meant to simulate ambient temperature (28° C.) compost conditions, for sample BC27240 made according to the present disclosure, as described in Example 2.

In order to meet the home compostability standards NF T51-800 (2015); AS 5810 (2010); or the OK Compost Home Certification scheme of TÜV Austria Belgium, it is also necessary to show disintegration of the sample film under such home composting conditions within 26 weeks. FIG. 10A shows progression of the disintegration of sample BC27240/1 (similar to sample BC27241 of Example 1, above) over the 26 week (182 days) test. Test sample BC27240/1 (thickness of 62 microns) was put into slide frames and mixed with compost inoculum. The obtained mixture was incubated in the dark at ambient temperatures (28±2° C.). The test was performed in 2 replicates. FIG. 10A shows photographs giving the visual presentation of the progression of the disintegration of test material BC27240/1 during the 26 weeks of composting at ambient temperature. After 20 weeks, only a small border of test materials remained present in the major part of the slide frames. Moreover, it was noticed that loosened pieces of the film could easily be retrieved from the composting reactor. A re-inoculation of all reactors with 5% fresh VGF waste was performed after an incubation period of 18 weeks in order to renew the microbial population and supply fresh nutrients. After 26 weeks, an average disintegration percentage of at least 90% was reached based on any remaining surface of test material still in the slide frames. No loosened pieces of test material were found in the compost inoculum after 26 weeks.

The French standard specification NF T51-800 Plastics—Specifications for plastics suitable for home composting (2015) and the OK compost HOME certification scheme of TÜV AUSTRIA Belgium stipulate that, when a material has passed the 90% disintegration requirement in a quantitative test according to ISO 16929 (Plastics—Determination of the Degree of Disintegration of Plastic Materials Under Defined Composting Conditions in a Pilot-Scale Test (2013), a material has demonstrated sufficient disintegration for home composting when in a qualitative test, based on ISO 20200 at ambient temperature (20° C.-30° C., e.g., 28° C.±2° C.), (1) after 26 weeks at least 81% of the test material surface within the slides has disappeared and (2) no remainders of the test material are distinguishable in the compost after testing.

According to the Australian standard specification AS 5810 Biodegradable Plastics—Biodegradable Plastics Suitable for Home Composting (2010) the criterion for evaluation of disintegration in the slide frame test is that 90% of the test material has disintegrated from the slide frame and any remaining residue shall not be distinguishable from the other material in the compost at 500 mm as observed by the naked eye.

Based on these results and as the 90% disintegration requirement of EN 13432 Requirements for Packaging Recoverable Through Composting and Biodegradation—Test Scheme and Evaluation Criteria for the Final Acceptance of Packaging (2000) is fulfilled (100% disintegration achieved), BC27240/1 at the tested thickness meets the requirement of disintegration according to the French standard specification NF T51-800 (2015), the OK compost HOME conformity mark and the Australian standard specification AS 5810 (2010).

Example 3

Summary and Conclusions

Figure 10B:
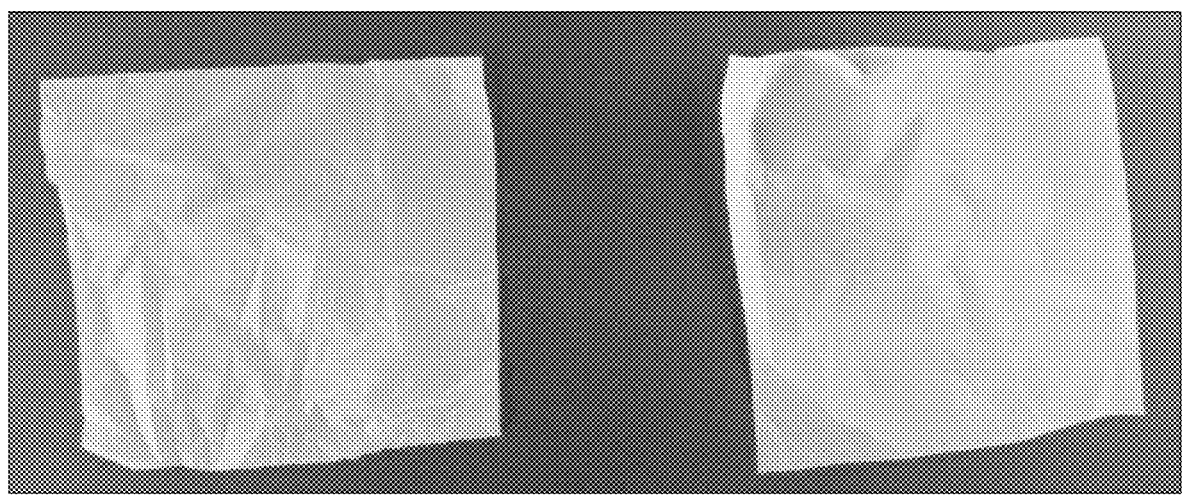
FIG. 10B shows photographs of test samples BC27130 and BC27251, at the start of testing, as described in Example 3.

FIG. 10B shows photographs of samples BC27130 and BC27251 (left and right respectively) prior to the start of their disintegration test. Sample BC27251 included 41% NuPlastiQ, 11% PLA, and 48% PBAT. No compatibilizer was present. Disintegration was evaluated at ambient temperature (28° C.) of test items BC27130 in a thickness of 49 µm and BC27251 in a thickness of 34 µm in a laboratory-scale composting test simulating home composting processes. As with the other examples herein, the test procedure was based on ISO 20200 (2015). Test materials BC27130 and BC27251 were added in a 0.5% concentration to a 80/20 mixture of <10 mm mature compost and fresh milled Vegetable, Garden and Fruit waste (VGF) as 2.5 cm×2.5 cm pieces. The test was performed in triplicate and lasted 17 weeks. At the end of the composting test, the compost was sieved, and disintegration was evaluated.

The disintegration of the 2.5 cm×2.5 cm pieces of BC27130 (49 µm) and BC27251 (34 µm) proceeded very well. The disintegration of BC27130 went somewhat faster than BC27251. After 14 weeks of composting all test material of BC27130 seemed completely degraded, while 2 weeks later the same could be concluded for BC27251. At the end of the composting test at ambient temperature (after 17 weeks), the whole content of the test reactors was used for sieving, sorting, further isolation and analysis. Disintegration is defined as a size reduction to <2 mm. For both test items, no single test item piece was retrieved in the >2 mm fraction. A disintegration percentage of 100.0% was obtained for BC27130 in a thickness of 49 µm and BC27251 in a thickness of 34 µm.

The French standard specification NF T51-800 Plastics—Specifications for plastics suitable for home composting (2015), the Australian standard specification AS 5810 Biodegradable plastics—Biodegradable plastics suitable for home composting (2010) and the OK compost HOME certification scheme of TÜV AUSTRIA Belgium stipulate that a material has demonstrated sufficient disintegration for home composting when after 26 weeks of composting at least 90% of the test material has reduced to a size <2 mm in a quantitative test according to ISO 20200 (2015) at ambient temperature (20° C.-30° C.).

Introduction—Purpose and Test Method

As complete disintegration was already obtained after an incubation period of 17 weeks at ambient temperature for test materials BC27130 in a thickness of 49 µm and BC27251 in a thickness of 34 µm, it can be concluded that the 90% disintegration criterion as prescribed by NF T51-800 (2015), AS 5810 (2010) and the OK compost HOME certification scheme of TÜV AUSTRIA Belgium was easily reached. Even in a higher thickness both materials have the potential to reach this requirement.

The purpose of this test was to evaluate the disintegration of a material at ambient temperature in a 80/20 mixture of <10 mm mature compost and fresh milled Vegetable, Garden and Fruit waste (VGF). During home composting the high temperatures (>50° C.), obtained during industrial composting processes, are typically not reached. Therefore, a material must demonstrate sufficient disintegration at ambient temperature before it can be allowed in home composting.

Each test item was mixed with a 80/20 mixture of <10 mm mature compost and fresh milled Vegetable, Garden and Fruit waste (VGF) and incubated at 28° C. in the dark. Regularly the moisture content is verified and adjusted when needed. The content of the reactors was regularly manually stirred, and the test item was visually monitored. The maximum test duration during which disintegration should be demonstrated was 26 weeks.

At the end of the test, the compost from each reactor was sieved by means of a vibrating sieve over 2 mm in order to recover any not disintegrated residues of the test material in the >2 mm fraction. Disintegration was evaluated very precisely by manual selection. If possible, a mass balance is calculated. The compost obtained at the end of the composting process can be used for further measurements such as chemical and physical analyses.

The test procedure is based on ISO 20200 Plastics—Determination of the degree of disintegration of plastic materials under simulated composting conditions in a laboratory-scale test (2015), with the following deviations when compared to ISO 20200 (2015):

Incubation at 28° C.±2° C. in order to simulate home composting conditions;

A mixture of 2 kg of the <10 mm fraction of mature compost and VGF per reactor is used instead of 1 kg of synthetic solid waste per reactor;

Once a week the disintegration is visually monitored and moisture conditions are evaluated and adjusted if needed instead of the monitoring process as prescribed by ISO 20200 (2015).

The test is considered valid if (when performed with a thermophilic and mesophilic incubation period):

The degrees of disintegration for the three replicates do not differ by more than 10%.

Test Items
Test Item 1
  Name: BC27130
  Description: Plastic film (FIG. 10B)
  Colour: Off-white
  Thickness: 49 μm±2 μm
  Total solids (TS): 94.4%
  Volatile solids (VS): 99.1% on TS
  Sample preparation: Cut into 2.5 cm×2.5 cm pieces
Test Item 2
  Name: BC27251
  Description: Plastic film (FIG. 10B)
  Colour: Off-white
  Thickness: 34 μm±2 μm
  Total solids (TS): 90.9%
  Volatile solids (VS): 99.0% on TS
  Sample preparation: Cut into 2.5 cm×2.5 cm pieces
Analytical Methods
Dry Matter or Total Solids The dry matter is determined by drying at 105° C. for at least 14 hours and weighing, as described in 'M_009. Determination of moisture content'. The dry matter is given in percent on wet weight.

pH

The pH is measured with a pH meter after calibration with standard buffer solutions (pH=4.00, pH=7.00 and pH=10.00), as described in 'M_006. Determination of pH and electrical conductivity'. Before inserting the electrode the sample is diluted with distilled water at a ratio of 5 to 1 (5 parts of demineralized water versus 1 part of sample) and thoroughly mixed, as described in 'M_012. Preparation of extracts and solutions'.

Thickness (Plastics)

After an acclimatization period of 24 hours at 23° C., 10 points are measured on the test item. The measurement is executed on a universal bench micrometer (accuracy of 0.1 μm) according to ISO 4593 Plastics—Film and sheeting—Determination of thickness by mechanical scanning (1993).

Total Nitrogen (N)

This analysis is done as described in 'M_039. Determination of total organic carbon and total nitrogen—Method by total carbon, total nitrogen and inorganic carbon combustion'. By combusting the sample at 950° C.-1200° C. and adding a controlled extra dose of oxygen for a short time, the nitrogen components will oxidize to nitrogen oxides (NOx). In the presence of a CuO catalyst and a copper reducer the nitrogen oxides are converted to $N_2$. The formed $N_2$ is measured by a Thermal Conductivity Detector (TCD). The results are given in g per kg total solids.

Volatile Solids—Ash

The volatile solids and ash content is determined by heating the dried sample at 550° C. for at least 4 hours and weighing, as described in 'M_010. Determination of organic matter and carbon content'. The results are given in percent on dry matter.

Weight Determination

During the test 2 types of balance are used. A Sartorius AC 210 S with internal calibration (max. 200 g; d=0.1 mg) for the determination of dry and volatile matter. A Sartorius CPA 12001 S (max. 12100 g, d=0.1 g) is used for weighing of the test item and the different components of the inoculum.

Results

Thickness of Test Items

The results of the thickness measurements on BC27130 and BC27251 are given in Table 3.

TABLE 3

|  | BC27130 | BC27251 |
| --- | --- | --- |
| Measured thickness (μm) (AVG ± SD) | 49 ± 2 | 34 ± 2 |
| Minimum thickness (μm) | 47 | 31 |
| Maximum thickness (μm) | 53 | 37 |

For each test item 3 reactors with a dimension of 30 cm×20 cm×13 cm (l, w, h) were started for the quantitative evaluation of the disintegration. The reactors contained a 80/20 mixture of <10 mm mature compost with an age of 16 weeks and fresh milled Vegetable, Garden and Fruit waste (VGF) and 0.5% 2.5 cm×2.5 cm pieces of BC27130 or BC27251. The 0.5% test item concentration was used for the determination and quantitative evaluation of the disintegration of the test item. The test set-up details of the quantitative test are given in Table 4.

TABLE 4

|  | BC27130 RN 01 | BC27130 RN 02 | BC27130 RN 03 | BC27251 RN 01 | BC27251 RN 02 | BC27251 RN 03 |
| --- | --- | --- | --- | --- | --- | --- |
| Mature Compost (age: 16 weeks) (g) | 1600 | 1600 | 1600 | 1600 | 1600 | 1600 |

TABLE 4-continued

|  | BC27130 RN 01 | BC27130 RN 02 | BC27130 RN 03 | BC27251 RN 01 | BC27251 RN 02 | BC27251 RN 03 |
|---|---|---|---|---|---|---|
| Fresh milled VGF | 400 | 400 | 400 | 400 | 400 | 400 |
| BC27130, 2.5 × 2.5 cm pieces (g) | 10 | 10 | 10 | — | — | — |
| BC27251, 2.5 × 2.5 cm pieces (g) | — | — | — | 10 | 10 | 10 |
| Total amount of mixture (g) | 2010 | 2010 | 2010 | 2010 | 2010 | 2010 |
| % BC27130, 2.5 × 2.5 cm pieces, on inoculum | 0.5 | 0.5 | 0.5 | — | — | — |
| % BC27251, 2.5 × 2.5 cm pieces, on inoculum | — | — | — | 0.5 | 0.5 | 0.5 |

Analysis Biowaste

The characteristics of the inoculum are given in Table 5. The inoculum was characterized by an optimal moisture content for composting (56.7%) and the C/N ratio of 9 ensures a sufficient nitrogen level. A normal pH of 7.0 was measured.

TABLE 5

|  | Inoculum |
|---|---|
| Total Solids (TS, %) | 43.3 |
| Moisture Content (%) | 56.7 |
| Volatile solids (VS, % on TS) | 52.0 |
| Ash content (% on TS) | 58.0 |
| Total N (g/kg TS) | 28.2 |
| C/N | 9 |
| pH | 7.0 |

Visual Perceptions

During the composting process the content of the reactors was mixed weekly and if needed, water was added in order to ensure optimal moisture conditions. The disintegration of the test material was carefully examined during the test.

Figure 10C:
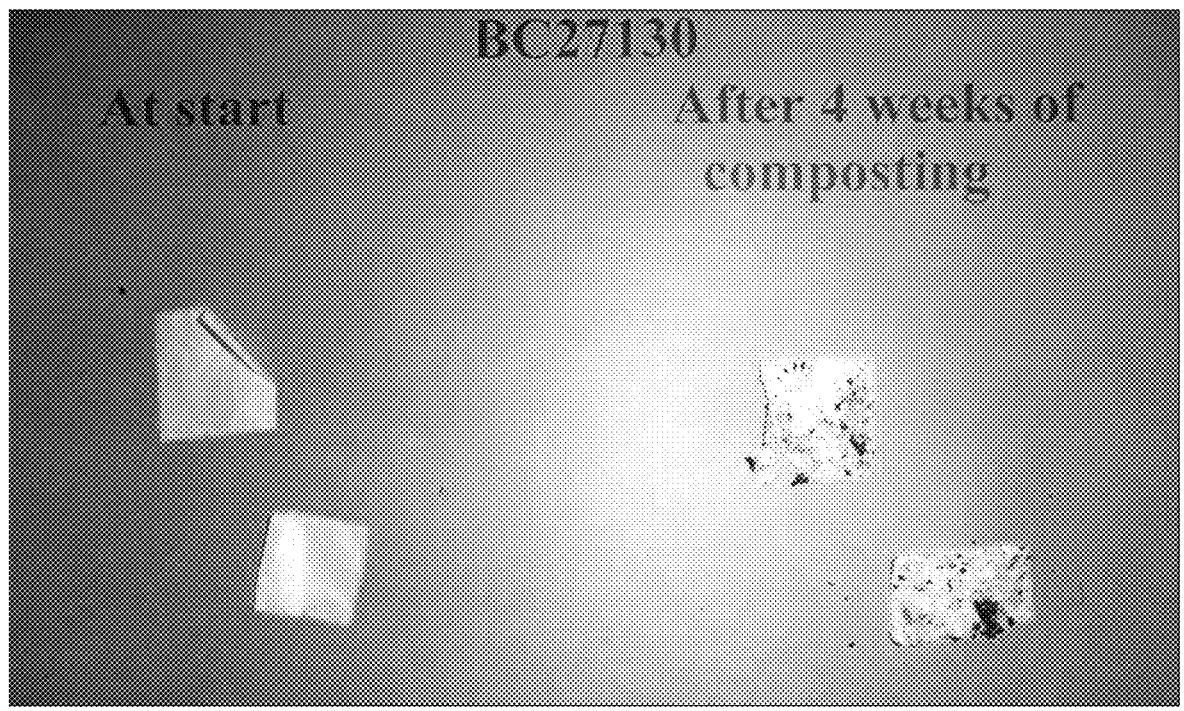
FIG. 10C shows a photographic comparison of test sample BC27130 at the start and after 4 weeks of testing, as described in Example 3.
Figure 10D:
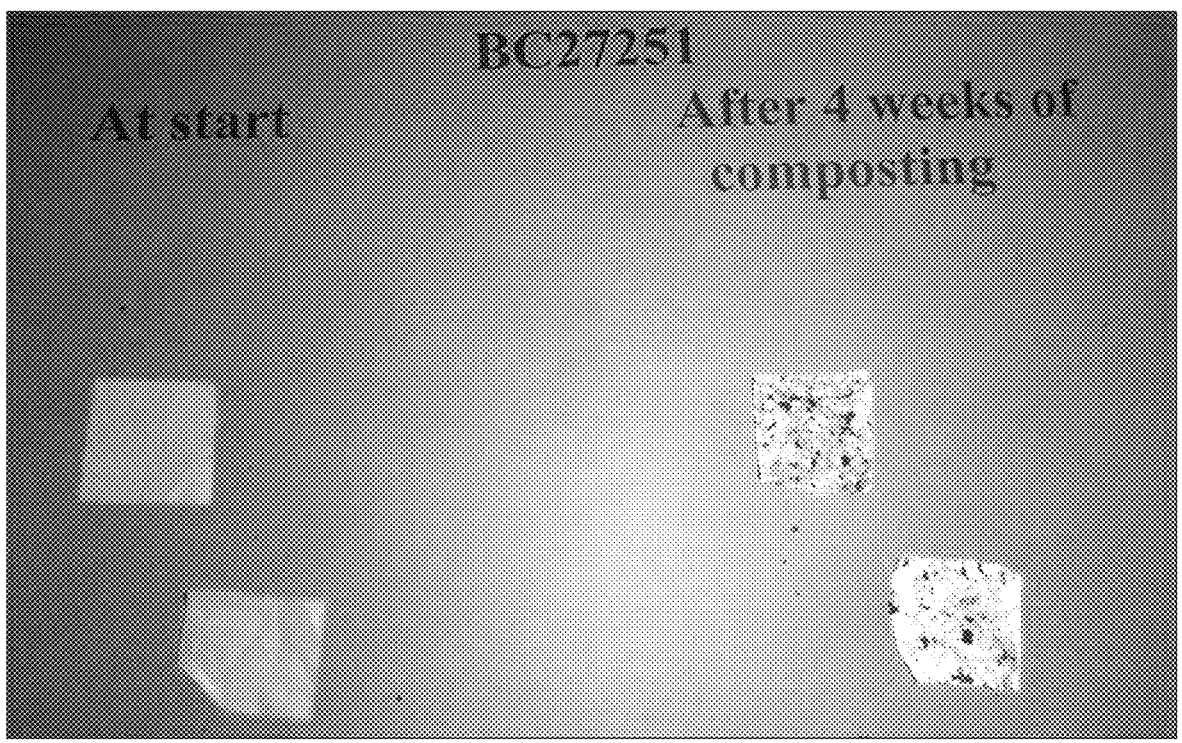
FIG. 10D shows a photographic comparison of test sample BC27251 at the start and after 4 weeks of testing, as described in Example 3.
Figure 10E:
FIG. 10E shows a photograph of the content of the composting reactor with test sample BC27130 after 8 weeks, as described in Example 3.
Figure 10F:
FIG. 10F shows a photograph of the content of the composting reactor with test sample BC27251 after 8 weeks, as described in Example 3.
Figure 10G:
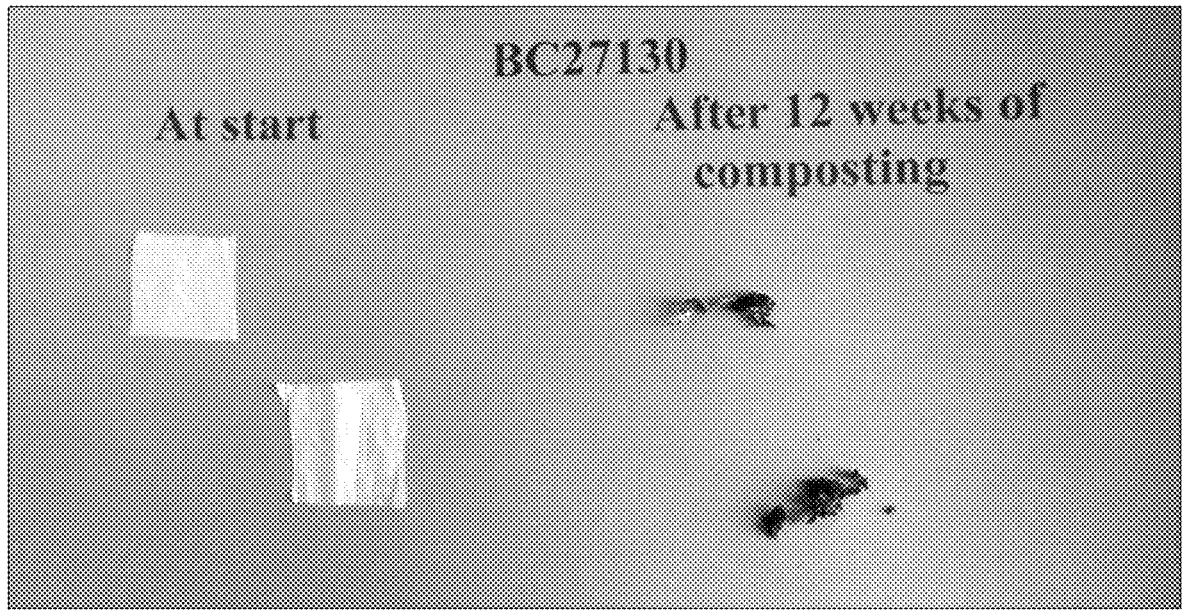
FIG. 10G shows a photographic comparison of test sample BC27130 at the start and after 12 weeks of testing, as described in Example 3.
Figure 10H:
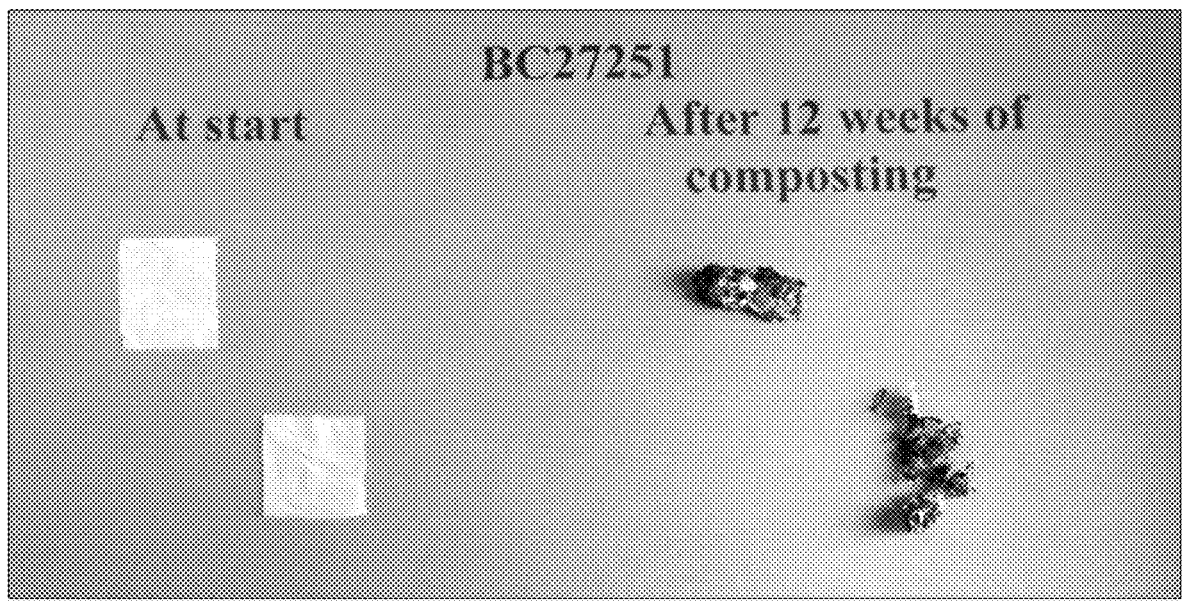
FIG. 10H shows a photographic comparison of test sample BC27251 at the start and after 12 weeks of testing, as described in Example 3.
Figure 10I:
FIG. 10I shows a photograph of the content of the composting reactor with test sample BC27130 after 14 weeks, as described in Example 3.
Figure 10J:
FIG. 10J shows a photograph of the content of the composting reactor with test sample BC27251 after 14 weeks, as described in Example 3.

The disintegration of the 2.5 cm×2.5 cm pieces of BC27130 in a thickness of 49 μm and BC27251 in a thickness of 34 μm both proceeded well. FIGS. 10C and 10D show a visual comparison between the 2.5 cm×2.5 cm pieces of BC27130 and BC27251, respectively, at start and after an incubation period of 4 weeks of ambient temperature composting. Tiny holes were observed in both test materials after 4 weeks. The amount of tiny holes in BC27130 (approximately 80% of the test material) was significantly more when compared with BC27251 (approximately 25% of the test material). Four weeks later (i.e., at 8 weeks) BC27130 started to fall apart, with an average size of approximately 1.5 cm×1.5 cm for the resulting pieces (FIG. 10E), FIG. 10F shows the resulting pieces for BC27251 at 8 weeks. It was also noticed that the color of both test materials had become brown. The disintegration went on and after 12 weeks of composting only a few pieces of BC27130 could be retrieved from the composting reactors (FIG. 10G), while BC27251 had also fallen apart into smaller pieces (FIG. 10H). During the following weeks the amount and size of the remaining pieces reduced further. After 14 weeks of composting no single piece of BC27130 could be found in the composting reactor (FIG. 10I), while two weeks later (at 16 weeks) BC27251 had also degraded completely (FIG. 10J).

Sieving—Disintegration

At the end of the test (after 17 weeks) the content of the reactors was dried. During the drying process the compost lumps were gently broken. The drying process was terminated when constant mass was reached. The compost from each reactor was sieved by means of a vibrating sieve over 2 mm in order to recover any not disintegrated residues of the test material in the >2 mm fraction. From Table 6 it can be seen that for both test items, no test material remained present in the >2 mm fraction for all replicates. The validity requirements of ISO 20200 (2015) were fulfilled.

TABLE 6

|  | Remaining sample in the >2 mm fraction (%) | Disintegration |
|---|---|---|
| BC27130 RN 01 | 0.0 | 100.0 |
| BC27130 RN 02 | 0.0 | 100.0 |
| BC27130 RN 03 | 0.0 | 100.0 |
| BC27251 RN 01 | 0.0 | 100.0 |
| BC27251 RN 02 | 0.0 | 100.0 |
| BC27251 RN 03 | 0.0 | 100.0 |

The French standard specification NF T51-800 Plastics—Specifications for plastics suitable for home composting (2015), the Australian standard specification AS 5810 Biodegradable plastics—Biodegradable plastics suitable for home composting (2010) and the OK compost HOME certification scheme of TÜV AUSTRIA Belgium stipulate that a material has demonstrated sufficient disintegration for home composting when after 26 weeks of composting, at least 90% of the test material has reduced to a size <2 mm in a quantitative test according to ISO 20200 (2015) at ambient temperature (20° C.-30° C.).

As complete disintegration was obtained for test materials BC27130 and BC27251 before 26 weeks, it can be concluded that the 90% disintegration criterion as prescribed by NF T51-800 (2015), AS 5810 (2010) and the OK compost HOME certification scheme of TÜV AUSTRIA Belgium was easily reached.

Test materials BC27130 BC27251 are, regarding the requirement of disintegration, eligible for OK compost HOME certification.

Chemical Analysis

Table 7 shows the results of the chemical analyses at the end of the test. A comparable volatile solids content was measured for the different replicates and normal pH values were obtained. The C/N ratio of the different replicates was 8.

TABLE 7

|  | BC27130 RN 01 | BC27130 RN 02 | BC27130 RN 03 | BC27251 RN 01 | BC27251 RN 02 | BC27251 RN 03 |
|---|---|---|---|---|---|---|
| Total Solids (TS, %) | 38.5 | 40.7 | 39.1 | 39.3 | 38.8 | 37.1 |
| Moisture Content (%) | 61.5 | 59.3 | 60.9 | 60.7 | 61.2 | 62.9 |
| Volatile solids (VS, % on TS) | 43.8 | 42.8 | 43.5 | 45.3 | 46.2 | 45.7 |
| Ash (% on TS) | 56.2 | 57.2 | 56.5 | 54.6 | 53.8 | 54.3 |
| pH | 8.2 | 8.1 | 8.3 | 8.2 | 8.0 | 8.2 |
| Total N (g/kg TS) | 26.2 | 28.1 | 26.5 | 27.6 | 29.5 | 27.6 |
| C/N | 8 | 8 | 8 | 8 | 8 | 8 |

While described principally in the context of PBAT as a main or significant component of the blends, it will be appreciated that there may be other polyester-based polymeric materials that could alternatively or additionally be used, e.g., in place of PBAT. For example, other polyester-based polymeric materials having relatively low stiffness (modulus of elasticity) include, but are not limited to, PCL and PBS. Where such materials may have similarly low stiffness, high flexibility, and/or high toughness (and low strength), they may similarly benefit from blending with PLA or a similarly rigid polyester for increased rigidity, where a carbohydrate-based polymeric material like NuPlastiQ is also included in the blend, which ensures that the blend as a whole meets home compostability requirements. In an embodiment, the present blends include a first polyester plastic material having a first elastic modulus (e.g., PBAT), a second polyester (e.g., comprising PLA), where the first polyester plastic material has an elastic modulus that is less (and/or a flexibility that is greater) than that of the second polyester (e.g., PLA). The blend also includes the carbohydrate-based polymeric material.

Similarly, while described principally in the context of PLA as the component added to the blend for increasing rigidity, it will be appreciated that there may be other polyester-based polymeric materials that could alternatively or additionally be used, e.g., in place of PLA. For example, PHA may have similarly high rigidity to PLA, and could be used to increase rigidity of PBAT, PBS, or PCL, all of which typically include low rigidity. By way of example, PLA may typically have an elastic modulus of about 3.5 to 4.0 GPa. PHA may typically have an elastic modulus of about 3 to 3.5 GPa. Both of these materials may exhibit relatively low elongation at break values (e.g., no more than about 200% for each, with PHA typically being no more than 100%). PBAT, PBS, and PCL typically exhibit far higher elongation at break values (e.g., from about 500 to about 800%), but relatively low elastic modulus (e.g., less than 1 GPa, and often less than 0.5 GPa). The present invention thus contemplates blending one of the low stiffness (i.e., low elastic modulus) materials (e.g., PBAT, PCL, PBS or the like) exhibiting high elongation at break with one of the polyester materials exhibiting high stiffness (high elastic modulus) and low elongation at break, in combination with the carbohydrate-based polymeric material, so that the blend as a whole is able to meet home compostability conditions.

It is to be understood that the embodiments of the inventive features disclosed herein are illustrative of the principles of the inventive features. Other modifications that may be employed are within the scope of the inventive features.

Thus, by way of example, but not of limitation, alternative configurations of the inventive features may be utilized in accordance with the teachings herein, e.g., at least as described in the above paragraph.

The invention claimed is:

1. A plastic material comprising a blend of:
   a first polyester plastic material comprising at least one of PBAT, PBS or PCL, having a first elastic modulus;
   a second polyester plastic material comprising PLA, wherein the first polyester plastic material has an elastic modulus that is less than that of the PLA, the PLA causing the blend to achieve an elastic modulus greater than the first polyester alone; and
   a carbohydrate-based polymeric material formed from a chemical reaction and/or alteration of a starch and a plasticizer, wherein the carbohydrate-based polymeric material: (1) is substantially devoid of starch in native form; (2) has a crystallinity of less than about 20% and resists recrystallization; (3) has a water content of no more than about 2% by weight; and (4) when blended in a mixture with a polyester plastic material, the blend exhibits a lack of sea-island features within said blend; wherein at least 90% by weight of the plastic material is home compostable at 28° C. within 365 days.

2. The material of claim 1, wherein the plastic material is substantially void of any compatibilizer.

3. The material of claim 1, wherein the first polyester plastic material comprises PBAT.

4. The material of claim 1, wherein the carbohydrate-based polymeric material is included in an amount from 10% to 60% by weight of the blend.

5. The material of claim 1, wherein the carbohydrate-based polymeric material is included in an amount from 30% to 60% by weight of the blend.

6. The material of claim 1, wherein the PLA is included in an amount of at least 5% by weight of the blend.

7. The material of claim 1, wherein the PLA is included in an amount of up to 20% by weight of the blend.

8. The material of claim 1, wherein the PLA is included in an amount of up to 15% by weight of the blend.

9. The material of claim 1, wherein the first polyester plastic material comprises PBAT, the PBAT being included in an amount of at least 30% by weight of the blend.

10. The material of claim 1, wherein the first polyester plastic material comprises PBAT, the PBAT being included in an amount from 30% to 70% by weight of the blend.

11. The material of claim 1, wherein the PLA exhibits compostability at 28° C. in the blend, whereas the PLA, when tested alone, exhibits reduced if any compostability at 28° C. within 365 days.

12. The material of claim 1, further comprising an inorganic filler within the blend.

13. The material of claim 12, wherein the inorganic filler comprises calcium carbonate.

14. The material of claim 12, wherein at least 90% by weight of the plastic material is home compostable at 28° C.±2° C. as determined under EN13432 within 365 days.

15. The material of claim 1, wherein the first polyester plastic material comprises PBS.

16. The material of claim 1, wherein the first polyester plastic material comprises PCL.

17. A plastic material comprising a blend of:
PBAT in an amount of at least 30% by weight of the blend;
PLA in an amount of up to 20% by weight of the blend; and
a carbohydrate-based polymeric material formed from a chemical reaction and/or alteration of a starch and a plasticizer, the carbohydrate-based polymeric material comprising 10% to 60% by weight of the blend, wherein the carbohydrate-based polymeric material: (1) is substantially devoid of starch in native form; (2) has a crystallinity of less than about 20% and resists recrystallization; (3) has a water content of no more than about 2% by weight; and (4) when blended in a mixture with a plastic material, the blend exhibits a lack of sea-island features within said blend;
wherein at least 90% by weight of the plastic material is home compostable under EN13432 at 28° C.±2° C. within 365 days.

18. The material of claim 17, wherein the carbohydrate-based polymeric material is included in an amount from 30% to 60% by weight of the blend.

19. The material of claim 17, wherein the PLA exhibits compostability at 28° C.±2° C. in the blend, whereas the PLA alone exhibits reduced if any compostability at 28° C.±2° C.

20. The material of claim 17, wherein the PLA is included in an amount up to 15% by weight of the blend.

21. The material of claim 17, wherein the PBAT is included in an amount from 30% to 70% by weight of the blend.

22. The material of claim 17, further comprising an inorganic filler within the blend.

23. The material of claim 22, wherein the inorganic filler comprises calcium carbonate, and is present from 5% to 30% by weight of the material.

24. The material of claim 22, wherein the inorganic filler comprises calcium carbonate, and is present from 10% to 30% by weight of the material.

25. A plastic material comprising a blend of:
a first polyester plastic material comprising at least one of PBAT, PBS or PCL, having a first elastic modulus;
a second polyester plastic material comprising PHA, wherein the first polyester plastic material has an elastic modulus that is less than that of the PHA, the PHA causing the blend to achieve an elastic modulus greater than the first polyester alone; and
a carbohydrate-based polymeric material formed from a chemical reaction and/or alteration of a starch and a plasticizer, wherein the carbohydrate-based polymeric material: (1) is substantially devoid of starch in native form; (2) has a crystallinity of less than about 20% and resists recrystallization; (3) has a water content of no more than about 2% by weight; and (4) when blended in a mixture with a polyester plastic material, the blend exhibits a lack of sea-island features within said blend;
wherein at least 90% by weight of the plastic material is home compostable at 28° C. within 365 days.

* * * * *